United States Patent

Hirata et al.

[11] Patent Number: 5,421,155
[45] Date of Patent: Jun. 6, 1995

[54] HYDRAULIC DRIVE SYSTEM FOR HYDRAULIC WORKING MACHINES

[75] Inventors: Toichi Hirata, Ushiku; Genroku Sugiyama; Koji Ishikawa, both of Ibaraki; Masami Ochiai, Atsugi, all of Japan

[73] Assignee: Hitachi Construction Machinery Co., Ltd., Tokyo, Japan

[21] Appl. No.: 211,417

[22] PCT Filed: Aug. 25, 1993

[86] PCT No.: PCT/JP93/01188

§ 371 Date: Mar. 28, 1994

§ 102(e) Date: Mar. 28, 1994

[87] PCT Pub. No.: WO94/04828

PCT Pub. Date: Mar. 3, 1994

[30] Foreign Application Priority Data

Aug. 25, 1992 [JP] Japan .................. 4-226031

[51] Int. Cl.⁶ ............................................ F16D 31/02
[52] U.S. Cl. .................................. 60/426; 60/452; 60/494; 91/517
[58] Field of Search ............... 91/517, 518; 60/426, 60/445, 447, 452, 450, 468, 494

[56] References Cited

U.S. PATENT DOCUMENTS

| | | | |
|---|---|---|---|
| 3,429,123 | 2/1969 | Buroughs | 60/450 |
| 4,011,721 | 3/1977 | Yip | 60/450 X |
| 4,079,805 | 3/1978 | Rau | 60/450 X |
| 4,479,349 | 10/1984 | Westveer | 60/450 X |
| 4,553,389 | 11/1985 | Tischer et al. | 91/517 X |
| 5,101,628 | 4/1992 | Yoshino | 60/452 X |

FOREIGN PATENT DOCUMENTS 47-3927 2/1972 Japan .
50-5354 3/1975 Japan .
63-88303 4/1988 Japan .

Primary Examiner—Edward K. Look
Assistant Examiner—Joang Nguyen
Attorney, Agent, or Firm—Fay, Sharpe, Beall, Fagan, Minnich & McKee

[57] ABSTRACT

A hydraulic drive system for hydraulic working machines has a variable displacement hydraulic pump, at least one actuator driven by the hydraulic fluid, a directional control valve of center bypass type for controlling the flow of the hydraulic fluid, a center bypass line for connecting the center bypass passage of the control valve to a reservoir and a fixed restrictor disposed in the center bypass line. A first control signal that determines a first target displacement of the hydraulic pump is determined by using the pressure generated by the fixed restrictor. A second control signal is generated for determining a second target displacement of a hydraulic pump. A third control signal, which is the larger one of the first and second control signals, provides a target displacement that is applied to a pump regulator that controls the displacement of the hydraulic pump. A metering characteristic as good as the conventional one can be obtained in the case of a light load, and a satisfactory metering characteristic can be achieved in the case of a heavy load, as a result.

15 Claims, 21 Drawing Sheets

HYDRAULIC DRIVE SYSTEM FOR HYDRAULIC WORKING MACHINES

TECHNICAL FIELD

The present invention relates to a hydraulic drive system for hydraulic working machines, and more particulary to a hydraulic drive system which is incorporated in hydraulic working machines such as hydraulic excavators and includes a directional control valve having a center bypass passage.

BACKGROUND ART

As described in JP, B, 47-3927 and JP, B, 50-5354, for example, a prior art hydraulic drive system of the above-mentioned type comprises a variable displacement hydraulic pump, at least one actuator driven by a hydraulic fluid delivered from the hydraulic pump, a directional control valve of center bypass type, which has a meter-in passage provided with a meter-in variable restrictor and a center bypass passage provided with a bleed-off variable restrictor, for controlling a flow of the hydraulic fluid supplied from the hydraulic pump to the actuator, a low pressure circuit, a center bypass line for connecting the center bypass passage to the low pressure circuit at a location downstream of the bleed-off variable restrictor, a pressure generator, e.g., fixed restrictor, disposed in the center bypass line, and a pump regulator for controlling a displacement of the hydraulic pump by using, as a control pressure, the pressure generated by the fixed restrictor.

The pump regulator carries out well-known negative control in accordance with the control pressure generated by the fixed restrictor. More specifically, the pump regulator makes control such that the displacement of the hydraulic pump is increased as the control pressure lowers and the pump displacement is decreased as it rises.

In the prior art thus constructed, when the directional control valve is gradually stroked from its neutral position with an intention of driving the actuator, an opening area of the bleed-off variable restrictor of the directional control valve is gradually reduced and, to the contrary, an opening area of the meter-in variable restrictor thereof is gradually increased.

When the directional control valve is in its neutral position or at a start point of its stroke, i.e., when the bleed-off variable restrictor begins to close, the control pressure generated by the fixed restrictor is high and the hydraulic pump is kept at a predetermined small displacement to deliver the hydraulic fluid at a standby flow rate which is a small value corresponding to the above predetermined small displacement. As the bleed-off variable restrictor is gradually closed, a pressure of the hydraulic fluid delivered from the hydraulic pump, i.e., a pump pressure, rises. Assuming now that the load pressure of the actuator is Pa, the actuator starts moving at the time the pump pressure rises in excess of Pa. Upon the actuator starting to move and the hydraulic fluid from the hydraulic pump beginning to be supplied to the actuator, the flow rate passing through the center bypass passage is reduced accordingly. With this reduction in the flow rate passing through the center bypass passage, the control pressure generated by the fixed restrictor in the center bypass line is lowered. The pump regulator is thus driven in such a manner as to increase the displacement of the hydraulic pump. As a result, the delivery rate of the hydraulic pump is gradually increased, thereby providing a predetermined flow rate characteristic, i.e., metering characteristic.

DISCLOSURE OF THE INVENTION

However, the aforementioned prior art has the problems as follows.

When the load pressure of the actuator is a relatively small pressure P2, the delivery rate of the hydraulic pump is relatively slowly increased corresponding to an increase in a spool stroke of the directional control valve and, therefore, the flow rate of the hydraulic fluid supplied to the actuator is also relatively slowly increased in response to the spool stroke, with the result of a satisfactory metering characteristic.

But when the load pressure of the actuator is provided by a pressure P1 higher than P2, the actuator will not start moving until the bleed-off variable restrictor is closed to such an extent that the pump pressure rises in excess of P1. At the pump pressure not higher than P1, therefore, the flow rate passing through the center bypass passage is not reduced and hence the pump delivery rate is not increases. Then, at the time the bleed-off variable restrictor is closed to such an extent that the pump pressure rises in excess of P1, the flow rate passing through the center bypass passage is reduced and the pump delivery rate is abruptly increased. In response to that, the flow rate of the hydraulic fluid supplied to the actuator is also abruptly increased, which greatly deteriorates the metering characteristic.

Taking a hydraulic excavator as an example, the above deterioration of the metering characteristic becomes more remarkable, particularly when an arm or a boom is operated on an assumption that the actuator is an arm cylinder for driving the arm or a boom cylinder for driving the boom. More practically, in the case where a load is light with a bucket kept empty, the load pressure of the arm cylinder or the boom cylinder is so small that the arm or the boom can be operated in a sufficiently satisfactory manner. In the case of a heavy load as experienced when work of lifting a heavy burden is to be carried out, however, the load pressure is so large that the arm or the boom will not move even when a lever for operating a directional control valve associated with the arm or a directional control valve associated with the boom is shifted to some extent, but starts moving when the lever is further shifted to approach the vicinity of the stroke end. Then, upon the lever being stroked just a little subsequent to the above condition, an operating speed of the arm or the boom is abruptly accelerated. Accordingly, an operator must carry out work while giving considerable care to the operation, resulting in that an improvement of operating efficiency is not expected and the operator feel much fatigued.

An object of the present invention is to provide a hydraulic drive system for hydraulic working machines which can realize a metering characteristic as satisfactory as in the prior art in the case of a light load, and can also ensure a satisfactory metering characteristic in the case of a heavy load.

To achieve the above object, according to the present invention, there is provided a hydraulic drive system for hydraulic working machines comprising a variable displacement hydraulic pump, at least one actuator driven by a hydraulic fluid delivered from said hydraulic pump, a directional control valve of center bypass type having meter-in passages provided with meter-in variable restrictors and a center bypass passage provided with bleed-off variable restrictors, and controlling a flow of the hydraulic fluid supplied from said hydraulic pump to said actuator, a low pressure circuit, a center bypass line for connecting said center bypass passage to said low pressure circuit at a location downstream of said bleed-off variable restrictors, pressure generating means disposed in said center bypass line, first signal generating means for generating a first control signal which determines a first target displacement of said hydraulic pump, by using a pressure generated by said pressure generating means, and a pump regulator for controlling a displacement of said hydraulic pump in accordance with said first control signal, wherein said hydraulic drive system further comprises second signal generating means for generating a second control signal which determines a second target displacement of said hydraulic pump, and select means for selecting, as a third control signal, larger one of said first control signal and said second control signal which provides a larger target displacement, and applying said third control signal to said pump regulator.

In the present invention thus constructed, the second target displacement determined by the second control signal in the second signal generating means is set beforehand such that it is smaller than the first target displacement determined by the first control signal when a load pressure of the actuator is relatively low, but becomes larger than the first target displacement at a higher load pressure of the actuator. Accordingly, in an operation of the actuator under a light load, the first control signal is selected by the select means and applied to the pump regulator for controlling the hydraulic pump so as to provide the first target displacement determined by the first control signal. As a result, a metering characteristic as good as in the prior art can be obtained.

Further, in an operation of the actuator under a heavy load, the second control signal is selected by the select means and applied to the pump regulator for controlling the hydraulic pump so as to provide the second target displacement which is different from and larger than the first target displacement determined by the first control signal. As a result, the flow rate supplied to the actuator increases relatively slowly with an increase in a stroke amount of the directional control valve, thereby providing a satisfactory metering characteristic.

In the above hydraulic drive system, preferably, said second signal generating means is means for generating, as said second control signal, a control signal variable depending on a stroke amount of said directional control valve. Said second signal generating means may be means for generating, as said second control signal, a control signal of constant magnitude.

Preferably, said first signal generating means includes a first pressure signal line for introducing the pressure generated by said pressure generating means, as said first control signal, to said select means, and said second signal generating means includes electric signal generating means for generating an electric signal of magnitude corresponding to said second target displacement, signal converting means for converting said electric signal into a pressure signal, and a second pressure signal line for introducing said pressure signal, as said second control signal, to said select means. In this case, preferably, said electric signal generating means includes means for detecting the stroke amount of said directional control valve and outputting an electric detection signal, and means for producing said electric signal in accordance with said detection signal.

Preferably, said first signal generating means includes means for detecting the pressure generated by said pressure generating means and outputting an electric detection signal, and means for calculating, as said first control signal, a first target value corresponding to said first target displacement in accordance with said detection signal, said second signal generating means includes means for calculating, as said second control signal, a second target value corresponding to said second target displacement, and said select means includes means for selecting larger one of said first and second target values, and means for producing an electric drive signal corresponding to said selected target value and outputting said electric drive signal to said regulator. In this case, preferably, said second signal generating means further includes means for detecting the stroke amount of said directional control valve and outputting an electric detection signal, and said means for calculating said second target value is means for calculating said second target value in accordance with said detection signal.

Preferably, said first signal generating means includes a first pressure signal line for introducing the pressure generated by said pressure generating means, as said first control signal to said select means, and said second signal generating means includes a second pressure signal line for introducing a pressure signal of magnitude corresponding to said second target displacement, as said second control signal, to said select means. In this case, preferably, said directional control valve is a pilot-operated valve driven by a pilot pressure, and said second pressure signal line introduces said pilot pressure as said pressure signal.

Preferably, said second signal generating means includes means for storing, as said second target displacement, at least two target displacements of which magnitudes are constant and different from each other, means operated in response to an ON/OFF signal for selecting one of said two target displacements, and means for producing said second control signal in accordance with said selected target displacement. In this case, preferably, said second signal generating means further includes means manipulated by an operator for outputting said ON/OFF signal. Said second signal generating means may further include means for producing said ON/OFF signal in accordance with an operation of said directional control valve.

Preferably, said pump regulator is a negative type regulator operating to increase a displacement of said hydraulic pump as a value of said third control signal reduces, and said first and second signal generating means are means for generating, as said first and second control signals, respective control signals of which values are smaller at the greater stroke amount of said directional control valve.

Said pump regulator may be a positive type regulator operating to increase a displacement of said hydraulic pump as a value of said third control signal increases, and said first and second signal generating means are means for generating, as said first and second control signals, respective control signals of which values are larger at the greater stroke amount of said directional control valve.

Further, the above hydraulic drive system may be arranged as comprising at least first and second actuators driven by the hydraulic fluid delivered from said hydraulic pump, a first directional control valve of center bypass type having meter-in passages provided with meter-in variable restrictors and a center bypass passage provided with bleed-off variable restrictors, and controlling a flow of the hydraulic fluid supplied from said hydraulic pump to said first actuator, and a second directional control valve of center bypass type having meter-in passages provided with meter-in variable restrictors and a center bypass passage provided with bleed-off variable restrictors, and controlling a flow of the hydraulic fluid supplied from said hydraulic pump to said second actuator, said center bypass line connecting said center bypass passages of said first and second directional control valves in series to said low pressure circuit. In this case, preferably, said second signal generating means includes first detecting means for detecting a stroke amount of said first directional control valve, second detecting means for detecting a stroke amount of said second directional control valve, and signal producing means for producing said second control signal in accordance with output signals from said first and second detecting means.

Said signal generating means includes, preferably, means for determining said third target displacement in accordance with the output signal from said first detecting means, means for determining said fourth target displacement in accordance with the output signal from said second detecting means, and means for adding said third and fourth target displacements to provide said second target displacement.

Said signal generating means may include means for determining said third target displacement in accordance with the output signal from said first detecting means, means for determining said fourth target displacement in accordance with the output signal from said second detecting means, and means for selecting larger one of said third and fourth target displacements to provide said second target displacement.

BEST MODE FOR CARRYING OUT THE INVENTION

Hereinafter, embodiments of a hydraulic drive system for hydraulic working machines of the present invention will be described with reference to the drawings.

First Embodiment

To begin with, a description will be given of a first embodiment of the present invention by referring to FIGS. 1 to 7.

Figure 1:
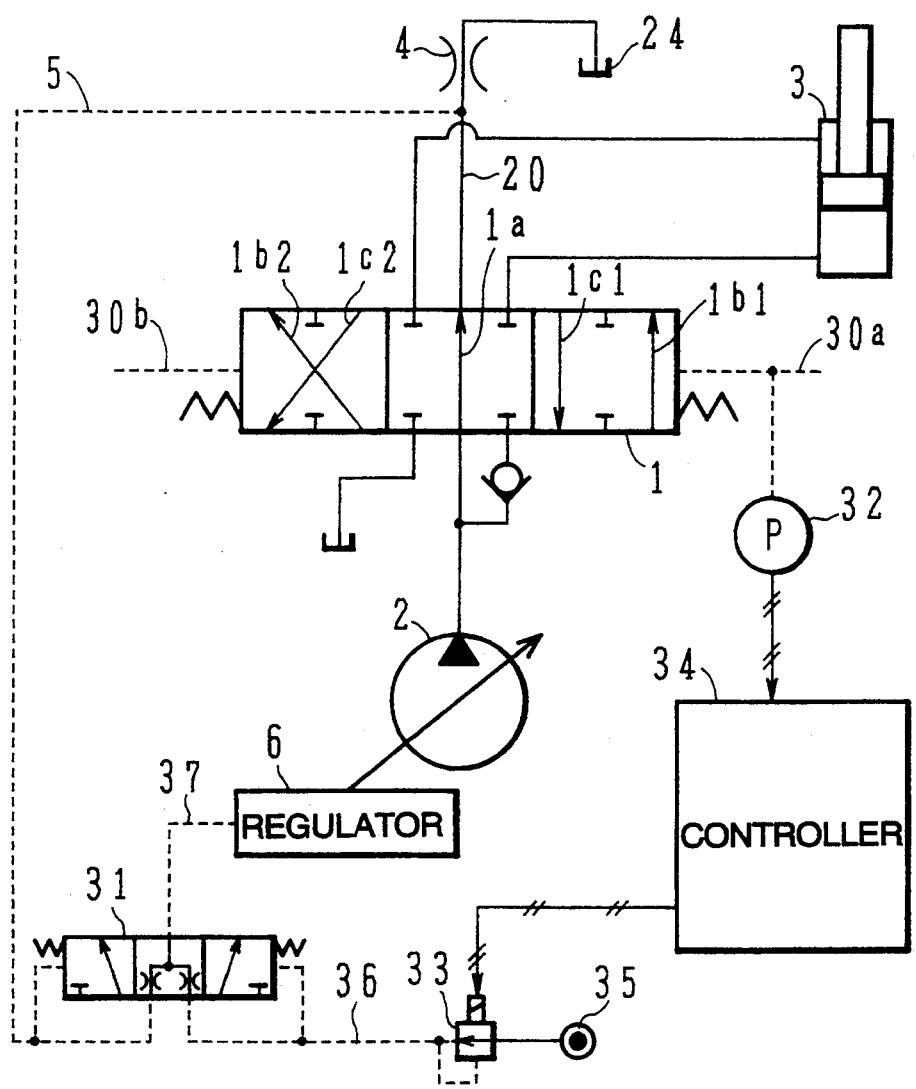
FIG. 1 is a circuit diagram showing a hydraulic drive system for hydraulic working machines according to a first embodiment of the present invention.

In FIG. 1, a hydraulic drive system according to the first embodiment is incorporated in a hydraulic excavator, for example, and comprises a variable displacement hydraulic pump 2, an actuator, e.g., an arm cylinder 3, driven by a hydraulic fluid delivered from the hydraulic pump 2, a directional control valve 1 of center bypass type for controlling a flow of the hydraulic fluid supplied from the hydraulic pump 2 to the arm cylinder 3, and a center bypass line 20.

Figure 2:
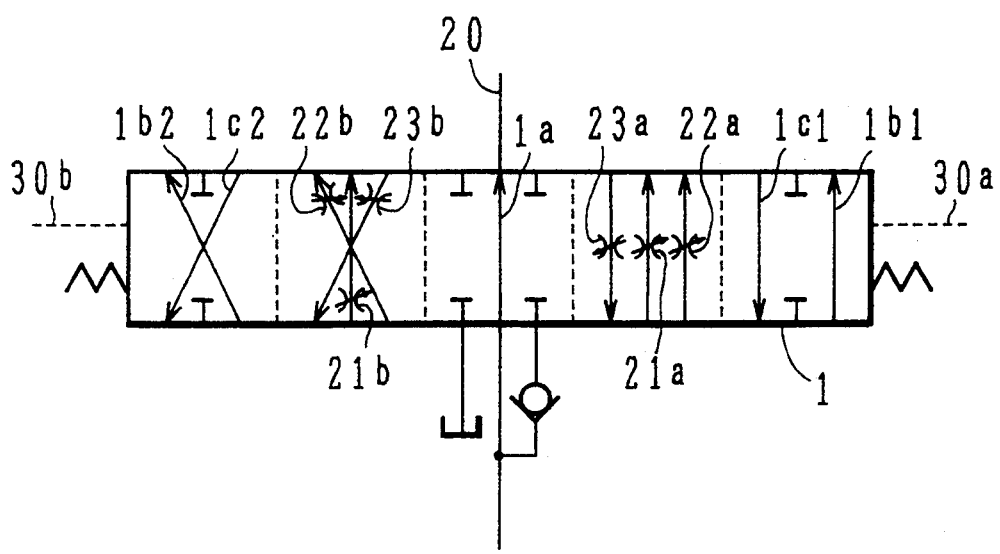
FIG. 2 is an explanatory view showing a transient position of a directional control valve shown in FIG. 1.

The directional control valve 1 is a pilot-operated valve driven by a pilot pressure introduced through a pilot line 30a, 30b, and includes a center bypass passage 1a, meter-in passages 1b1, 1b2 and meter-out passages 1c1, 1c2. As shown in FIG. 2, the center bypass passage 1a is provided with bleed-off variable restrictors 21a, 21b, the meter-in passages 1b1, 1b2 are provided with meter-in variable restrictors 22a, 22b, and the meter-out passages 1c1, 1c2 are provided with meter-out variable restrictors 23a, 23b, respectively. Downstream of the bleed-off variable restrictors 21a, 21b, the center bypass passage 1a is connected to a low pressure circuit, e.g., a reservoir 24, via the center bypass line 20.

Figure 3A:
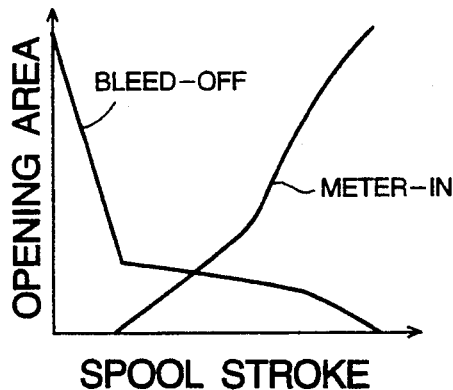
FIG. 3(a) is a graph showing the relationship of a spool stroke of the directional control valve versus opening areas of a bleed-off variable restrictor and a meter-in variable restrictor.

When the directional control valve 1 is gradually stroked from its neutral position, the relationship between an opening area of the bleed-off variable restrictors 21a, 21b and an opening area of tile meter-in variable restrictors 22a, 22b exhibits characteristics shown in FIG. 3(a). More specifically, the opening area of the bleed-off variable restrictors 21a, 21b is gradually diminished with an increase in a spool stroke of the directional control valve 1 and, to the contrary, the opening area of the meter-in variable restrictors 22a, 22b is gradually enlarged with an increase in the spool stroke.

Returning to FIG. 1 again, the hydraulic drive system of this embodiment further comprises a pressure generator, e.g., a fixed restrictor 4, disposed in the center bypass line 20, a first pressure signal line 5 for introducing, as a first control pressure, the pressure generated by the fixed restrictor 4, a pressure sensor 32 for detecting the magnitude of a pilot pressure introduced through the pilot line 30a and outputting an electric detection signal corresponding to the detected magnitude, a controller 34 for executing an arithmetic operation based on the detection signal and outputting an electric drive signal corresponding to a second control pressure, a hydraulic source 35, a solenoid proportional reducing valve 33 driven by the drive signal output from the controller 34 for producing the second control pressure by using a hydraulic fluid from the hydraulic source 35, a second pressure signal line 36 for introducing the second control pressure produced by the solenoid proportional reducing valve 33, a lower-pressure select valve 31 for selecting lower one of the first control pressure introduced through the first pressure signal line 5 and the second control pressure introduced through the second pressure signal line 36 and outputting the selected control pressure to a third pressure signal line 37, and a pump regulator 6 for controlling a displacement of the hydraulic pump 2 in accordance with the control pressure outpost to the third pressure signal line 37.

The pump regulator 6 is a negative type regulator; hence it controls the hydraulic pump 2 such that the displacement of the hydraulic pump 2 is increased as the control pressure lowors and the pump displacement is decreased as it rises.

Figure 4:
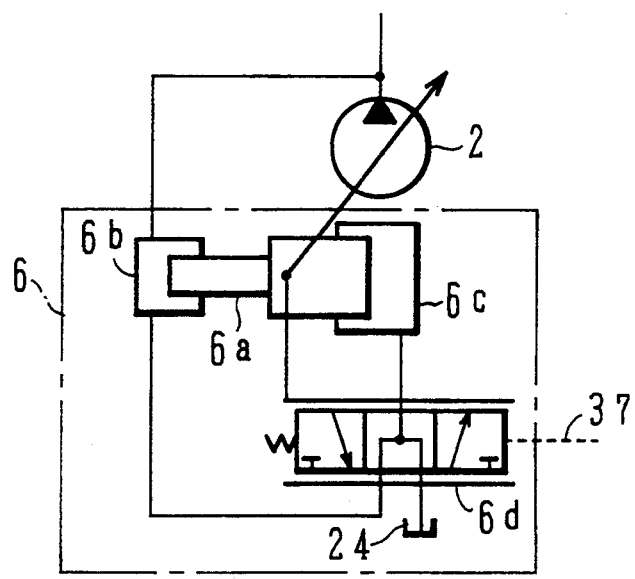
FIG. 4 is a circuit diagram showing the construction of a pump regulator shown in FIG. 1.

Details of the pump regulator 6 is shown in FIG. 4. The pump regulator 6 is constituted by a piston 6a, a small diameter chamber 6b and a large diameter chamber 6c for respectively accommodating opposite ends of the piston 6a, and a servo valve 6d operated in accordance with the control pressure introduced through the third pressure signal line 37. The small diameter chamber 6b is connected to a delivery line of the hydraulic pump 2, and the large diameter chamber 6c is selectively connectable to the small diameter chamber 6b or the reservoir 24 depending on an operation of the servo valve 6d.

The pump regulator 6 has characteristics as follows. When the control pressure is high, the servo valve 6d is shifted to the left in FIG. 4, whereupon the small diameter chamber 6b and the large diameter chamber 6c are communicated with each other. At this time, the pump pressure is supplied to both the small diameter chamber 6b and the large diameter chamber 6c for moving the piston 6a to the left in FIG. 4 due to a difference in pressure receiving area between the small diameter chamber 6b and the large diameter chamber 6c. As a result, the hydraulic pump 2 is controlled to be kept at a relatively small predetermined capacity (displacement) 10a, as shown in FIG. 5.

Figure 5:
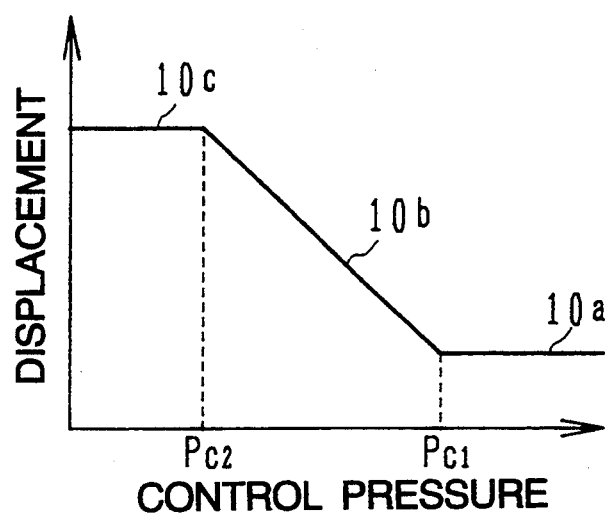
FIG. 5 is a graph showing a control characteristic of the pump regulator shown in FIG. 4.

Then, when the control pressure lowers down to a value smaller than Pc1 shown in FIG. 5, the servo valve 6d is shifted to the right in FIG. 4, whereupon the large diameter chamber 6c is now communicated with the reservoir 24. Therefore, the piston 6a is moved to the right in FIG. 4 by the pump pressure applied to the small diameter chamber 6b. As a result, the hydraulic pump 2 is controlled to have a displacement 10b which gradually increases from the above displacement 10a, as shown in FIG. 5.

Further, when the control pressure lowers down to a value smaller than Pc2 shown in FIG. 5, the hydraulic pump 2 is controlled to have a predetermined maximum displacement 10c.

In the case of gradually stroking the directional control valve 1 toward its shift position shown on the right side in FIG. 1 with an intention to extend the arm cylinder 3, the relationship between the spool stroke of the directional control valve 1 and the first control pressure introduced through the first signal line 5 is given below because the opening area of the bleed-off variable restrictors 21a and the opening area of the meter-in variable restrictors 22a change as shown in FIG. 3(a). More specifically, for the operation under a light load in which the load pressure of the arm cylinder 3 is relatively low as indicated by P2 in FIG. 3(b), the first control pressure is relatively large and constant over a range X2 of the spool stroke before the arm cylinder 3 starts moving, i.e., at the spool stroke until the pump pressure rises to exceed the load pressure of the arm cylinder 3, and thereafter it slowly reduces in an almost proportional relation with an increase in the spool stroke, as represented by a solid line in FIG. 3(c). On the other hand, for the operation under a heavy load in which the load pressure of the arm cylinder 3 becomes high as indicated by P1 in FIG. 3(b), a range X1 of the spool stroke before the arm cylinder 3 starts moving is larger than the range X2 at P2; namely, the first control pressure is kept constant for a longer range, and thereafter it quickly reduces in an almost proportional relation with an increase in the spool stroke, as represented by a one-dot-chain line in FIG. 3(c).

Figure 6:
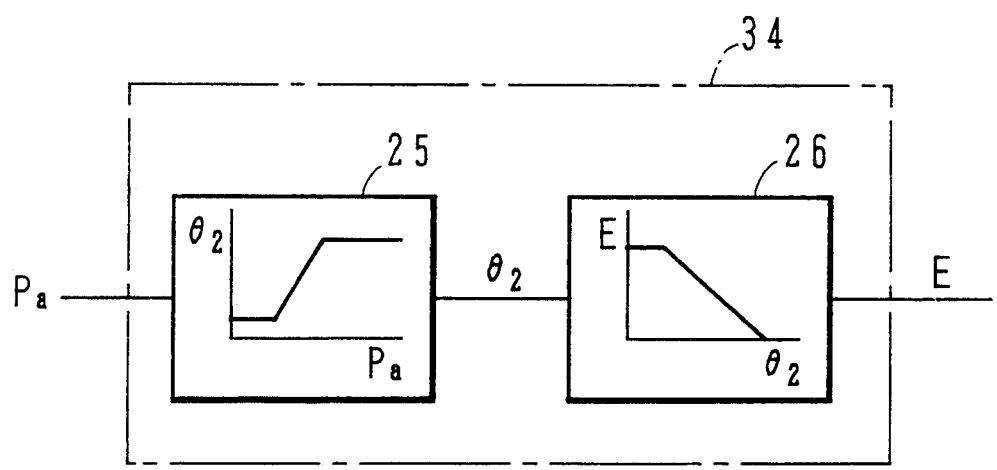
FIG. 6 is a block diagram showing a control function of a controller shown in FIG. 1.
Figure 7:
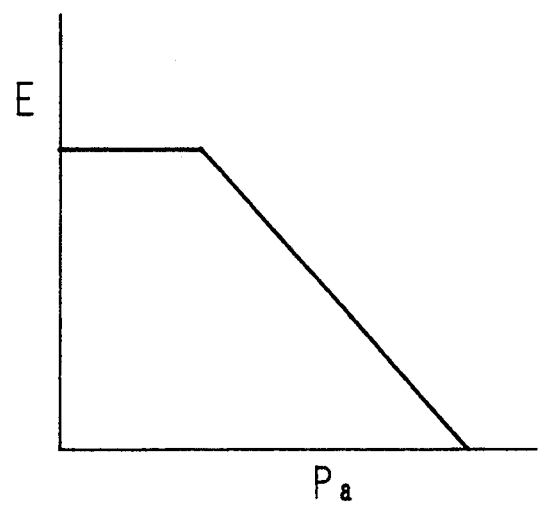
FIG. 7 is a graph showing a control characteristic of the controller shown in FIG. 6.

The controller 34 includes, as shown in FIG. 6, a function generator 25 for storing the relationship following which a target displacement h2 increases with a rise of the pilot pressure Pa as a value of the detection signal output from the pressure sensor 32, and calculating the target displacement h2 depending on the pilot pressure Pa, and a function generator 26 for setting the relationship following which an electric drive signal E reduces with an increase in the target displacement h2 output from the function generator 25. As a result of the arithmetic operation, the controller 34 outputs the electric drive signal E which reduces with an increase in the pilot pressure Pa, as shown in FIG. 7, to the solenoid proportional reducing valve 33. The solenoid proportional reducing valve 33 is driven by the drive signal E to produce a pressure, as the second control pressure, of which magnitude is almost proportional to the drive signal E.

Figure 3D:
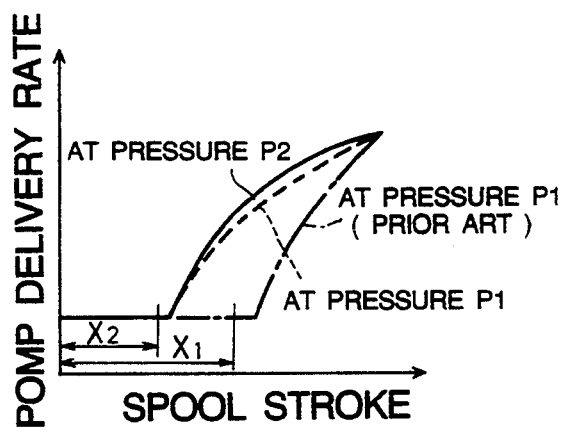
FIG. 3(d) is a graph showing the relationship between the spool stroke of the directional control valve and a delivery rate of the hydraulic pump.
Figure 3B:
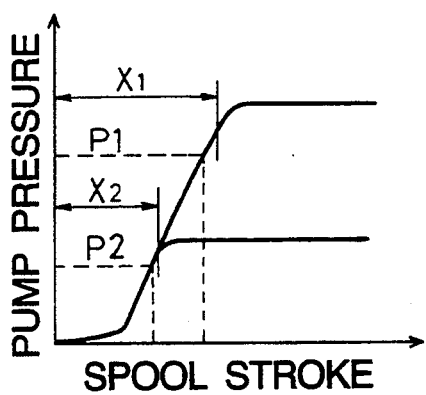
FIG. 3(b) is a graph showing the relationship between the spool stroke of the directional control valve and a delivery pressure of a hydraulic pump.
Figure 3E:
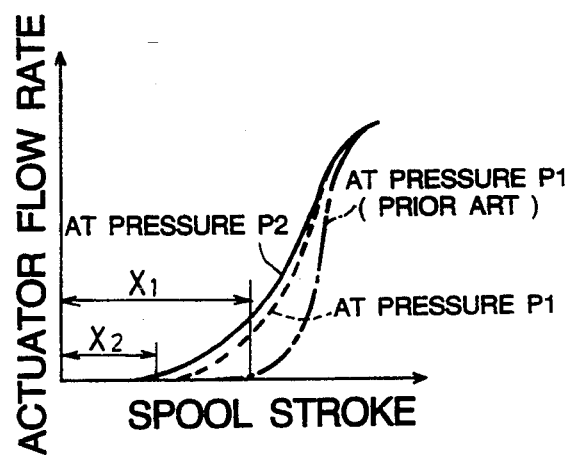
FIG. 3(e) is a graph showing the relationship between the spool stroke of the directional control valve and a flow rate supplied to an actuator.
Figure 3C:
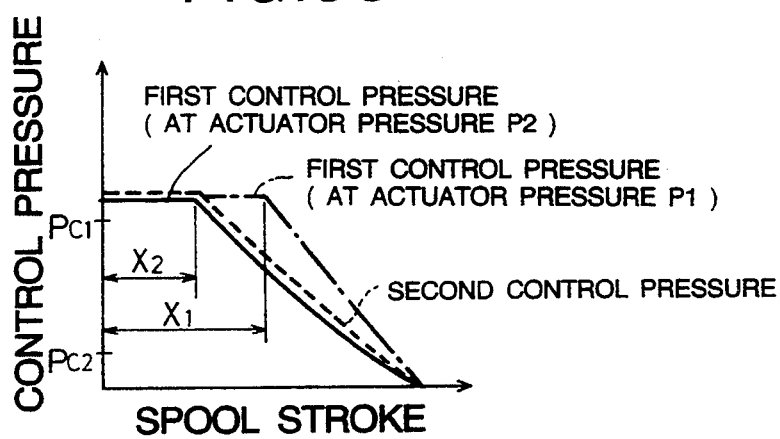
FIG. 3(c) is a graph showing the relationship of the spool stroke of the directional control valve versus first and second control pressures.

The relationship between the second control pressure thus produced and the spool stroke of the directional control valve 1 is set, as represented by a broken line in FIG. 3(c), such that the second control pressure is slightly greater than the first control pressure represented by the solid line in FIG. 3(c) and resulted from the case of a light load at a relatively low predetermined load pressure of the arm cylinder 3, e.g., the aforesaid pressure P2.

In the above construction, the first control pressure functions as a first control signal for determining a first target displacement of the hydraulic pump 2, and the fixed restrictor 4 and the first pressure signal line 5 cooperatively constitute first signal generating means which generates the first control signal. Also, the second control pressure functions as a second control signal for determining a second target displacement (h2 in FIG. 6) of the hydraulic pump 2, and the pressure sensor 32, the controller 34, the hydraulic source 35, the solenoid proportional reducing valve 33 and the second pressure signal line 36 cooperatively constitute second signal generating means which generates the second control signal. Further, the lower-pressure select valve 6 constitutes select means for selecting one of the first control signal and the second control signal which provides a larger target displacement, and applying the selected control signal to the pump regulator 6.

The first embodiment constructed as explained above operates as follows.

Assume now, for example, that in the case of a light load with the bucket kept empty, i.e., where the load pressure is relatively small as indicated by P2 in FIG. 3(b), the directional control valve 1 is gradually stroked toward its shift position shown on the right side in FIG. 1 with an intention of extending the arm cylinder 3. In such a situation, as explained above with reference to FIG. 3(a), the opening area of the bleed-off variable restrictor 21a is gradually diminished and, to the contrary, the opening area of the meter-in variable restrictor 22a is gradually enlarged. The pressure generated by the fixed restrictor 4 at this time is applied as the first control pressure to a left drive sector of the select valve 31 shown in FIG. 1 through the first pressure signal line 5. On the other hand, the spool stroke of the directional control valve 1 is detected by the pressure sensor 32 as the pilot pressure Pa generated in the pilot line 30a, and then input to the controller 34. The controller 34 outputs the drive signal E, depending on the pilot pressure Pa as shown in FIG. 7, to the solenoid proportional reducing valve 33, whereupon the solenoid proportional reducing valve 33 is driven for applying the second control pressure to a right drive sector of the select valve 31 shown in FIG. 1 through the second pressure signal line 36.

The first and second control pressures applied to the select valve 31 in that way are provided as indicated by the solid line and the broken line in FIG. 3(c), respectively, as mentioned above. The second control pressure is larger than the first control pressure,, whereby the select valve 31 is switched to its one shift position shown on the right side in FIG. 1. Accordingly, the first pressure signal line 5 is communicated with the third pressure signal line 37 through the select valve 31, while the second pressure signal line 36 is disconnected from the third pressure signal line 37. As a result, the pump regulator 6 is controlled by the first control pressure.

When the directional control valve 1 is at a start point of its stroke, i.e., when the bleed-off variable restrictor 21a disposed in the center bypass passage 1a begins to close, the hydraulic pump 2 is kept at the predetermined small displacement 10a shown in FIG. 5 to deliver the hydraulic fluid at a standby flow rate which is a small value corresponding to the displacement 10a. As the bleed-off variable restrictor 21a is gradually closed, a pressure of the hydraulic fluid delivered from the hydraulic pump 2, i.e., the pump pressure, rises as shown in FIG. 3(b). At the time the pump pressure rises in excess of P2, the arm cylinder 3 starts moving. Upon the arm cylinder 3 starting to move and the hydraulic fluid from the hydraulic pump beginning to be supplied to the actuator, the flow rate passing through -the center bypass passage 1a is reduced accordingly. With this reduction in the flow rate passing through the center bypass passage 1a, the pressure generated by the fixed restrictor 4 is lowered. This also lowers the first control pressure applied to the pump regulator 6 through the first pressure signal line 5 and the lower-pressure select valve 31 so that the pump regulator 6 is driven to increase the displacement of the hydraulic pump 2. As a result, the delivery rate of the hydraulic pump 2 is gradually increased, thereby providing a predetermined low rate characteristic, i.e., metering characteristic.

The relationship between the spool stroke of the directional control valve 1 and the pump delivery rate obtained at this time is as indicated by a characteristic curve of "at pressure P2" in FIG. 3(d). Correspondingly, the relationship between the spool stroke of the directional control valve 1 and a flow rate supplied to the arm cylinder 3 is as indicated by a characteristic curve of "at pressure P2" in FIG. 3 (e).

In other words, since the load pressure of the arm cylinder 3 is provided by the relatively small pressure P2, the pump delivery rate increases relatively slowly in accordance with an increase in the spool stroke of the directional control valve 1 as indicated by the characteristic curve of "at pressure P2" in FIG. 3(d) and, correspondingly, the flow rate supplied to the arm cylinder 3 also increases relatively slowly with respect to the spool stroke as indicated by a characteristic curve of "at pressure P2" in FIG. 3(e) in a similar relation to the characteristic curve of the pump delivery rate. Thus, a satisfactory metering characteristic can be obtained.

As an alternative example, when the directional control valve 1 is gradually stroked toward its shift position shown on the right side in FIG. 1 with an intention of extending the arm cylinder 3 in the case of a heavy load with the bucket hanging a burden, i.e., in a situation where the load pressure is considerably large as indicated by P1 in FIG. 3(b), the first control pressure applied to the left drive sector of the select valve 31 through the first pressure signal line 5 is provided as indicated by the one-dot-chain line in FIG. 3(c), as mentioned above, while the second control pressure applied to the right drive sector of the select valve 31 through the solenoid proportional reducing valve 33 and the second pressure signal line 36 is held as indicated by the broken line in FIG. 3(c). In this case, the first control pressure is larger than the second control pressure, whereby the select valve 31 is switched to its other shift position shown on the left side in FIG. 1. Accordingly, the second pressure signal line 36 is communicated with the third pressure signal line 37 through the select valve 31, while the first pressure signal line 5 is disconnected from the third pressure signal line 37. As a result, the pump regulator 6 is controlled by the second control pressure. The relationship between the spool stroke of the directional control valve 1 and the pump delivery rate obtained at this time is as indicated by a characteristic curve of "at pressure P1" in FIG. 3(d). The resulting characteristic of the pump delivery rate with respect to the spool stroke has values a little smaller than the characteristic of "at pressure P2", but both the characteristics are almost equal to each other in configuration of their curves. Correspondingly, the relationship between the spool stroke of the directional control valve 1 and the flow rate supplied to the arm cylinder 3 is as indicated by a characteristic curve of "at pressure P1" in FIG. 3(e). The resulting characteristic of the flow rate supplied to the arm cylinder 3 with respect to the spool stroke has values a little smaller than the characteristic of "at pressure P2", but both the characteristics are almost equal to each other in configuration of their curves. Consequently, in the case of a heavy load, the flow rate supplied to the arm cylinder 3 also increases relatively slowly in accordance with an increase in the spool stroke of the directional control valve 1, thereby providing a satisfactory metering characteristic, similarly to the case of a light load.

For comparison, the relationship between the spool stroke and the pump delivery rate and the relationship between the spool stroke and the actuator flow rate in the prior art are indicated by one-dot-chain lines in FIGS. 3 (d) and 3 (e), respectively. Since the pump regulator 6 is driven by the first control pressure in the prior art even when the load pressure of the arm cylinder 3 is considerably large as indicated by P1 in FIG. 3(b), the arm cylinder 3 will not start moving unless the bleed-off variable restrictor 21a is throttled to such an extent that the pump pressure rises in excess of P1 under the condition of the hydraulic pump 2 delivering the hydraulic fluid at the standby flow rate. At the pump pressure lower than P1, therefore, the flow rate passing through the center bypass passage 1a is not reduced and hence the pump delivery rate is not increased. When the opening area of the bleed-off variable restrictor 21a is diminished to such an extent that the pump pressure exceeds P1, the flow rate passing through the center bypass passage 1a starts reducing, whereupon the pump delivery rate is increased abruptly as indicated by the one-dot-chain line in FIG. 3(d). Correspondingly, the flow rate supplied to the arm cylinder 3 also increases abruptly with respect to the spool stroke of the directional control valve 1 in similar relation to the characteristic curve of the pump delivery rate, as indicated by the one-dot-chain line in FIG. 3(e), meaning that the metering characteristic is remarkably deteriorated.

With the first embodiment, as described above, in addition to providing the metering characteristic as good as conventional in the case of a light load, the flow rate supplied to the arm cylinder 3 also increases relatively slowly in accordance with an increase in the spool stroke of the directional control valve 1 in the case of a heavy load, resulting in the satisfactory metering characteristic almost comparable to that in the case of a light load. It is thus possible to overcome inconvenience which has been experienced in the lever operation of the directional control valve 1 for the case of a heavy load, improve the working efficiency, and make the operator feel less fatigued with the lever operation.

Second Embodiment

A second embodiment of the present invention will be described with reference to FIGS. 8 to 11. In these figures, identical members to those in FIG. 1 and others are denoted by the same reference numerals. In this embodiment, the first signal generating means, the second signal generating means, the select means and the pump regulator are electrically constituted.

Figure 8:
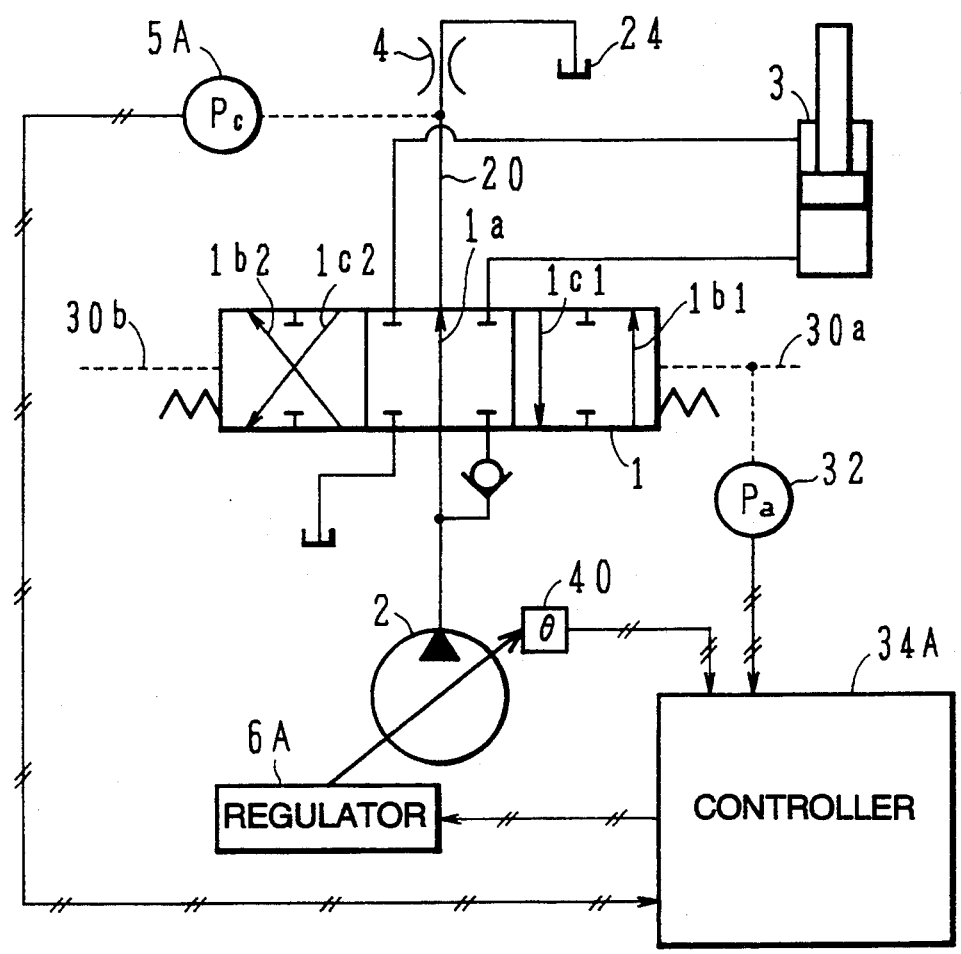
FIG. 8 is a circuit diagram showing a hydraulic drive system for hydraulic working machines according to a second embodiment of the present invention.

In FIG. 8, a hydraulic drive system of this second embodiment comprises, beside the pressure sensor 32 in the first embodiment, a pressure sensor 5A for detecting a magnitude of the pressure generated by the fixed restrictor 4 and outputting a corresponding electric detection signal to a controller 34A, and an angular displacement sensor 40 for detecting a tilting angle h of a swash plate, for example, as a variable indicating "the displacement of the hydraulic pump 2 and outputting a corresponding electric detection signal to the controller 34A. Based on the detection signals from the pressure sensors 32, 5A and the angular displacement sensor 40, the controller 34A outputs ON/OFF electric drive signals by which a pump regulator 6A controls the displacement of the hydraulic pump 2.

Figure 9:
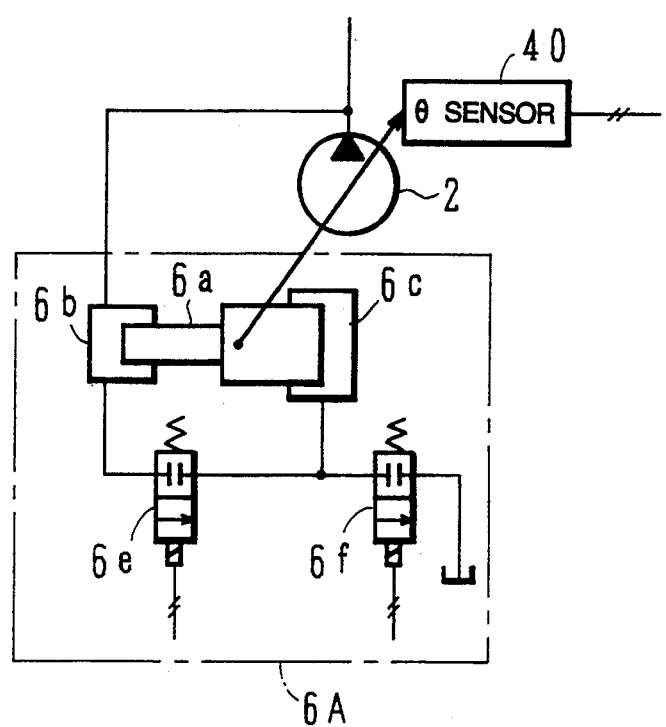
FIG. 9 is a circuit diagram showing the construction of a pump regulator shown in FIG. 8.

The construction of the pump regulator 6A is shown in FIG. 9. The pump regulator 6A comprises a first solenoid switching valve be disposed in a first passage communicating the small diameter chamber 6b and the large diameter chamber 6c for opening or closing the first passage in response to a first electric drive signal output from the controller 34A, and a second solenoid switching valve 6f disposed in a second passage communicating the large diameter chamber 6c and the reservoir for opening or closing the second passage in response to a second electric drive signal output from the controller 34A.

In the plump regulator 6A shown in FIG. 9, by keeping the second solenoid switching valve 6f closed and operating the first solenoid switching valve 6e to open, the pump pressure is supplied to both the small diameter chamber 6b and the large diameter chamber 6c for moving the piston 6a to the left in FIG. 9 due to a difference in pressure receiving are between the small diameter chamber 6b and the large diameter chamber 6c, whereby the hydraulic pump 2 is controlled to reduce its displacement. On the other hand, by keeping the first solenoid switching valve 6e closed and operating the second solenoid switching valve 6f to open, the communication between the small diameter chamber 6a and the large diameter chamber 6c is cut off and the large diameter chamber 6c is communicated with the reservoir for moving the piston 6a to the right in FIG. 9 by the pump pressure applied to the small diameter chamber 6a, whereby the hydraulic pump 2 is controlled to increase its displacement.

Figure 10:
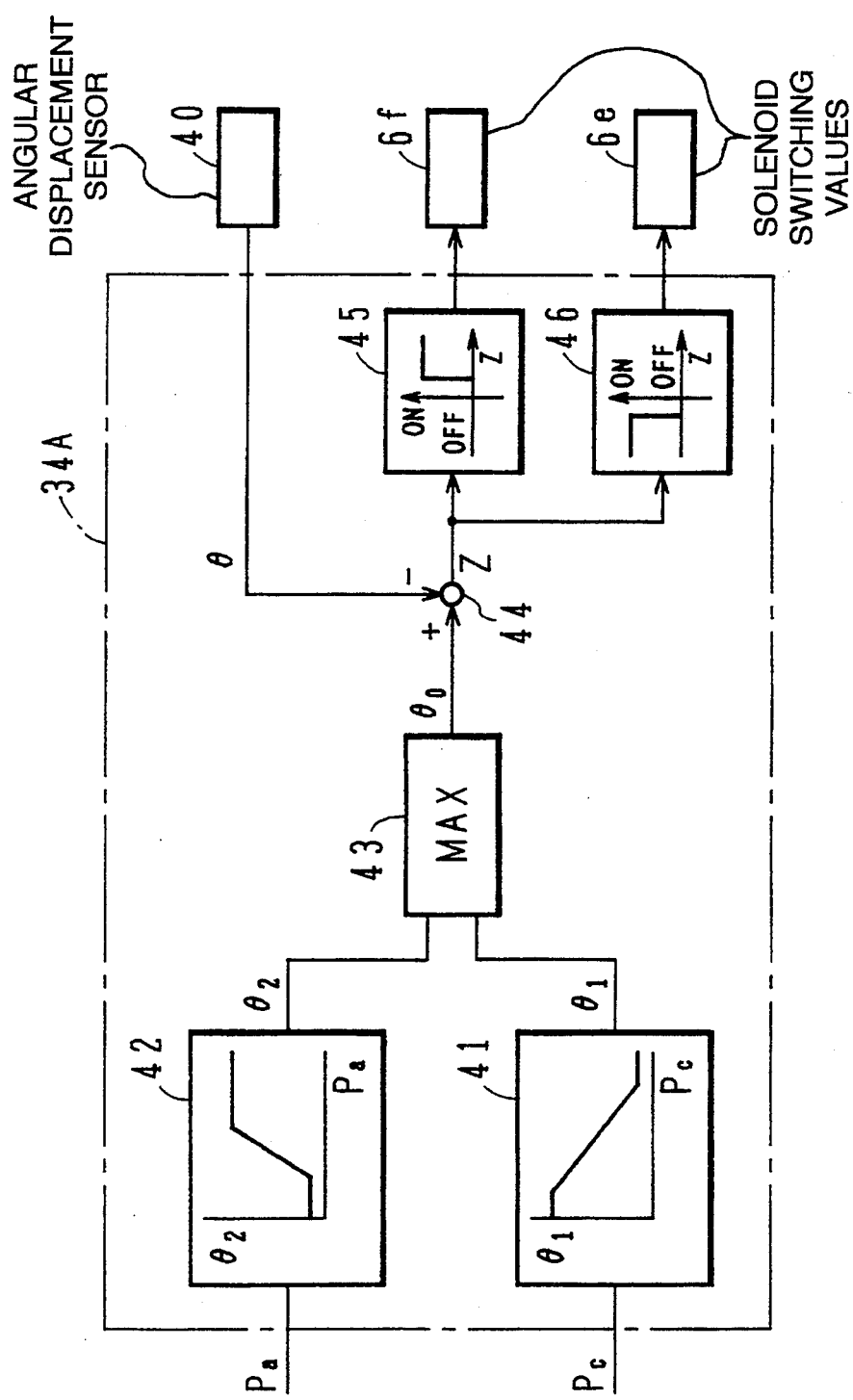
FIG. 10 is a block diagram showing a control function of a controller shown in FIG. 8.

Aisle, the controller 34A includes, as shown in FIG. 10, a function generator 25 for storing the relationship following which a first target displacement h1 reduces with a rise of the pressure Pc which is generated by the fixed restrictor 4 as a value of the detection signal output from the pressure sensor 5A, and calculating the first target displacement h1 depending on the pressure Pc, a function generator 42 for storing the relationship following which a second target displacement h2 increases with a rise of the pilot pressure Pa as a value of the detection signal output from the pressure sensor 32, and calculating the second target displacement h2 depending on the pilot pressure Pa, a maximum value selector 43 for comparing a magnitude of the first target displacement h1 output from the function generator 41 and a magnitude of the second target displacement h2 output from the function generator 42 and outputting larger one as a third target displacement h0, a subtracter 44 for calculating a deviation Z between the third target displacement h0 and the value h of the detection signal output from the angular displacement sensor 40, an output unit 45 for outputting an ON signal to the solenoid switching valve 6f shown in FIG. 9 when the deviation Z is a positive value, and an output unit 45 for outputting an ON signal to the solenoid switching valve 6e shown in FIG. 9 when the deviation Z is a negative value.

Figure 11:
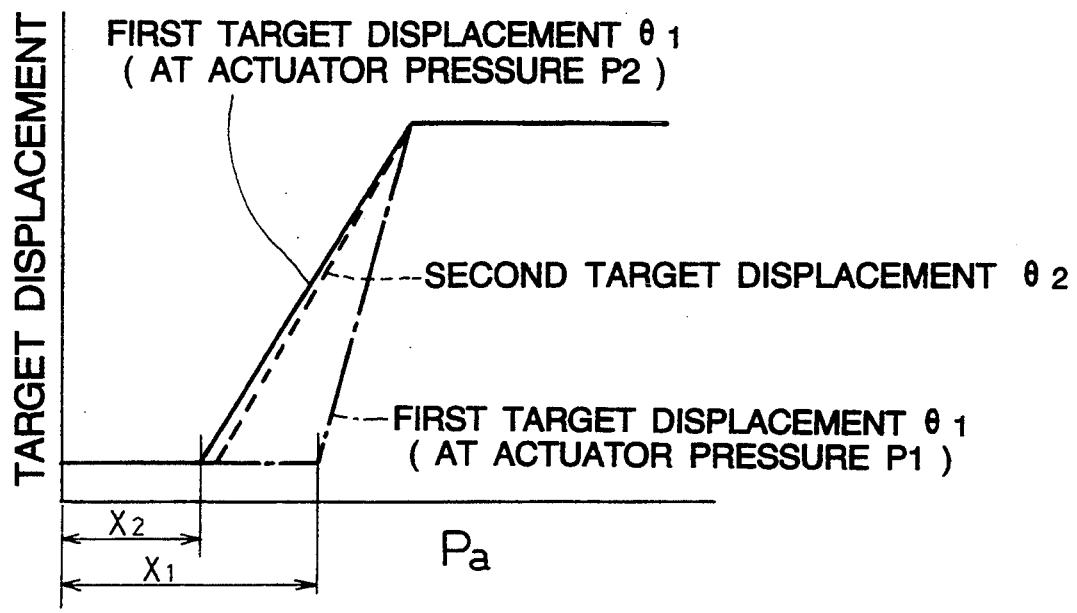
FIG. 11 is a graph showing a control characteristic of the controller having the control function shown in FIG. 10.

When the first target displacement h1 is obtained by the function generator 41 as mentioned above, the relationship between the pilot pressure Pa introduced to the pilot line 30a for the directional control valve 1 and the first target displacement h1 is as shown in FIG. 11. More specifically, for the operation under a light load in which the load pressure of the arm cylinder 3 is relatively low as indicated by P2 in FIG. 3(b), the first target displacement h1 is minimum and constant over a range X2 of the spool stroke before the arm cylinder 3 starts moving, i.e., at the pilot pressure corresponding to the spool stroke until the pump pressure rises to exceed the load pressure of the arm cylinder 3, and thereafter it slowly reduces in an almost proportional relation with an increase in the pilot pressure, as represented by a solid line in FIG. 11. On the other hand, for the operation under a heavy load in which the load pressure of the arm cylinder 3 becomes high as indicated by P1 in FIG. 3(b), the pilot pressure corresponding to a range X1 of the spool stroke before the arm cylinder 3 starts moving is larger than the pilot pressure corresponding to the range X2 at P2; namely, the first target displacement h1 is kept constant for a longer range, and thereafter it abruptly increases in an almost proportional relation with an increase in the pilot pressure Pa, as represented by a one-dot-chain line in FIG. 11.

In comparison with the above relationship between the pilot pressure Pa and the first target displacement h1, the relationship between the second target displacement h2 generated by the function generator 42 and the pilot pressure Pa is set, as represented by a broken line in FIG. 11, such that the second target displacement h2 is slightly smaller than the first target displacement h1 represented by the solid line in FIG. 11 and resulted from the case of a light load at a relatively low predetermined load pressure of the arm cylinder 3, e.g., the aforesaid pressure P2.

In the above construction, the fixed restrictor 4, the pressure sensor 5A and the function generator 41 of the controller 34A cooperatively constitute first signal generating means which generates a first control signal for determining the first target displacement h1. Also, the pressure sensor 32 and the function generator 42 of the controller 34A cooperatively constitute second signal generating means which generates a second control signal for determining the second target displacement h2. Further, the maximum value selector 43 of the controller 34A constitutes select means for selecting one of the first control signal and the second control signal which provides a larger target displacement, and applying the selected control signal to the pump regulator 6A.

In the second embodiment constructed as explained above, when the directional control valve 1 is gradually stroked toward its shift position shown on the right side in FIG. 8 with an intention of extending the arm cylinder 3, for example, in the case of a light load with the bucket kept empty, i.e., in a situation where the load pressure is relatively small as indicated by P2 in FIG. 3(b), the first target displacement h1 calculated by the function generator 41 of the controller 34A is provided as indicated by the solid line in FIG. 11 and the second target displacement h2 is provided as indicated by the broken line in FIG. 11, as mentioned before. Thus, the first target displacement h1 is larger than the second target displacement h2, whereby the maximum value selector 43 selects the first target displacement h1 as the third target displacement h0. The subtracter 44 and the output units 45, 46 convert the third target displacement h0 (=h1) into the ON/OFF electric drive signal which are output to the solenoid switching valves 6e, 6f of the pump regulator 6A. As a result, the displacement of the hydraulic pump 2 is controlled to become coincident with the first target displacement h1.

The relationship between the spool stroke of the directional control valve 1 and the pump delivery rate obtained at this time is similar to that indicated by the characteristic curve of "at pressure P2" in FIG. 3(d). Correspondingly, the relationship between the spool stroke of the directional control valve 1 and the flow rate supplied to the arm cylinder 3 is similar to that indicated by the characteristic curve of "at pressure P2" in FIG. 3(e). In other words, as with the first embodiment, the flow rate supplied to the arm cylinder 3 increases relatively slowly with respect to the spool stroke, thereby providing a satisfactory metering characteristic.

As an alternative example, when the directional control valve 1 is gradually stroked toward its shift position shown on the right side in FIG. 1 with an intention of extending the arm cylinder 3 in the case of a heavy load with the bucket banging a burden, i.e., in a situation where the load pressure is considerably large as indicated by P1 in FIG. 3(b), the first target displacement h1 calculated by the function generator 41 of the controller 34A is provided as indicated by the one-dot-chain line in FIG. 11 and the second target displacement h2 is provided as indicated by the broken line in FIG. 11, as mentioned before. Thus, the second target displacement h2 is larger than the first target displacement h1, whereby the maximum value selector 43 selects the second target displacement h2 as the third target displacement h0. The subtracter 44 and the output units 45, 46 convert the third target displacement h0 (=h2) into the ON/OFF electric drive signal which are output to the solenoid switching valves 6e, 6f of the pump regulator 6A. As a result, the displacement of the hydraulic pump 2 is controlled to become coincident with the second target displacement h2.

The relationship between the spool stroke of the directional control valve 1 and the pump delivery rate obtained at this time is similar to that indicated by the characteristic curve of "at pressure P1" in FIG. 3(d). Correspondingly, the relationship between the spool stroke of the directional control valve 1 and the flow rate supplied to the arm cylinder 3 is similar to that indicated by the characteristic curve of "at pressure P1" in FIG. 3(e). Consequently, in the case of a heavy load, the flow rate supplied to the arm cylinder 3 also increases relatively slowly in accordance with an increase in the spool stroke of the directional control valve 1, thereby providing a satisfactory metering characteristic, similarly to the case of a light load.

With the second embodiment, therefore, in addition to providing the metering characteristic as good as conventional in the case of a light load, the satisfactory metering characteristic almost comparable to that in the case of a light load can also be obtained in the case of a heavy load. It is thus possible to improve the working efficiency and make the operator feel less fatigued.

Third Embodiment

A third embodiment of the present invention will be described with reference to FIGS. 12 to 16. In these figures, identical members to those in FIG. 1 and others are denoted by the same reference numerals. In this embodiment, the first signal generating means, the second signal generating means, the select means and the pump regulator are hydraulically constituted and the pump regulator is of the positive type.

Figure 12:
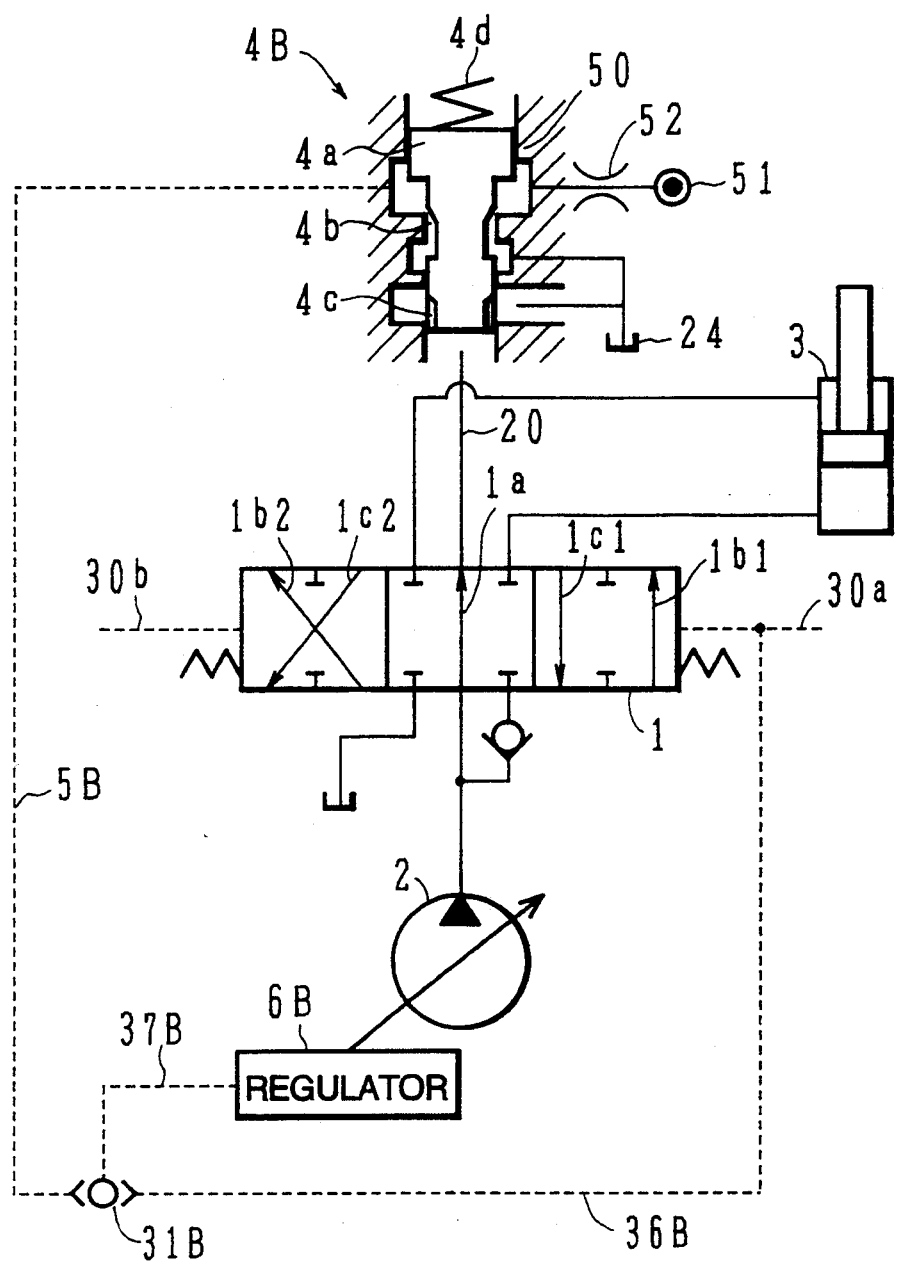
FIG. 12 is a circuit diagram showing a hydraulic drive system for hydraulic working machines according to a third embodiment of the present invention.

In FIG. 12, a hydraulic drive system of this third embodiment comprises a pressure generator 4B disposed in the center bypass line 20 for generating a pressure which rises with an increase in the spool stroke of the directional control valve 2, a first pressure signal line 5B for introducing, as a first control pressure, the pressure generated by the pressure generator 4B, a second pressure signal line 36B for introducing, as a second control pressure, the pilot pressure introduced through the pilot line 30a, a higher-pressure select valve, e.g., a shuttle valve 31, for selecting higher one of the first and second control pressures respectively introduced through the first and second pressure signal lines 5B, 36B and outputting the selected control pressure to a third pressure signal line 37B, and a pump regulator 6B for controlling a displacement of the hydraulic pump 2 in accordance with the control pressure output to the third pressure signal line 37B.

The pump regulator 6B is a positive type regulator; hence it controls the hydraulic pump 2 such that the displacement of the hydraulic pump 2 is increased as the control pressure rises and the pump displacement is decreased as it lowers.

Figure 13:
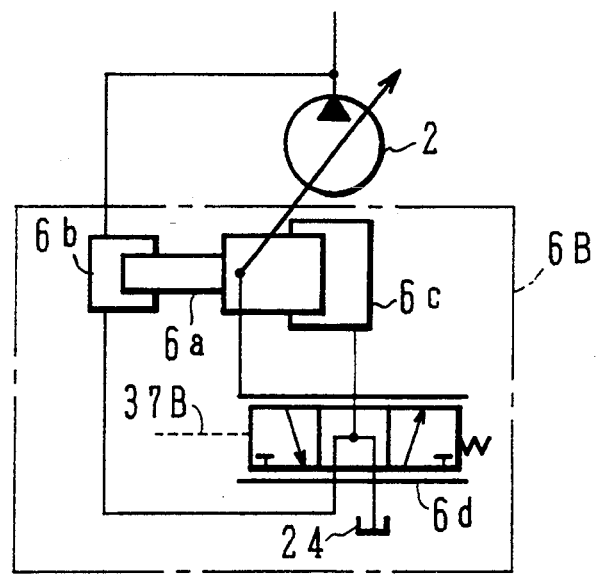
FIG. 13 is a circuit diagram showing the construction of a pump regulator shown in FIG. 12.

Details of the pump regulator 6B is shown in FIG. 13. The pump regulator 6B is constituted by a piston 6a, a small diameter chamber 6b and a large diameter chamber 6c for respectively accommodating opposite ends of the piston 6a, and a servo valve 6d operated in accordance with the control pressure introduced through the third pressure signal line 37B. The small diameter chamber 6b is connected to a delivery line of the hydraulic pump 2, and the large diameter chamber 6c is selectively connectable to the small diameter chamber 6b or the reservoir 24 depending on an operation of the servo valve 6d.

The pump regulator 6 has characteristics as follows. When the control pressure is low, the servo valve 6d is shifted to the left in FIG. 13, whereupon the small diameter chamber 6b and the large diameter chamber 6c are communicated with each other. At this time, the pump pressure is supplied to both the small diameter chamber 6b and the large diameter chamber 6c for moving the piston 6a to the left in FIG. 13 due to a difference in pressure receiving area between the small diameter chamber 6b and the large diameter chamber 6c. As a result, the hydraulic pump 2 is controlled to be kept at a relatively small predetermined capacity (displacement) 7a, as shown in FIG. 14.

Figure 14:
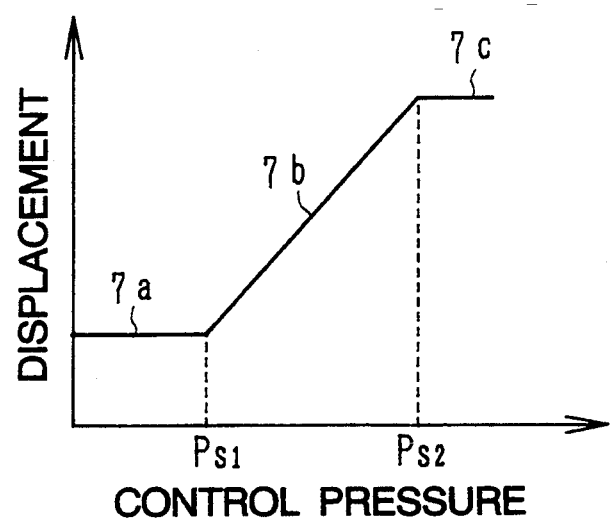
FIG. 14 is a graph showing a control characteristic of the pump regulator shown in FIG. 13.

Then, when the control pressure rises up to a value larger than Ps1 shown in FIG. 14, the servo valve 6d is shifted to the right in FIG. 13, whereupon the large diameter chamber 6c is now communicated with the reservoir 24. Therefore, the piston 6a is moved to the right in FIG. 13 by the pump pressure applied to the small diameter chamber 6b. As a result, the hydraulic pump 2 is controlled to have a displacement 7b which gradually increases from the above displacement 7a, as shown in FIG. 14.

Further, when the control pressure rises up to a value larger than Ps2 shown in FIG. 14, the hydraulic pump 2 is controlled to have a predetermined maximum displacement 7c.

Returning to FIG. 12 again, the pressure generator 4B comprises a restricting device 50 having a spool 4a which is slidable against urging force of a spring 4d in proportion to the flow rate passing through the center bypass passage 1a for increasing respective opening areas of a flow rate sensing notch 4c and a variable restrictor 4b, a hydraulic source 51 for supplying a hydraulic fluid to the variable restrictor 4b of the restricting device 50, and a fixed restrictor 52 provided between the variable restrictor 4b and the hydraulic source 51. The variable restrictor 4b is connected at its input side to the first pressure signal line 5B so that the pressure generated by the variable restrictor 4b is introduced, as the first control pressure, to the first pressure signal line 5B. The flow rate sensing notch 4c and the variable restrictor 4b are connected at their output sides to the reservoir 24.

Figure 15:
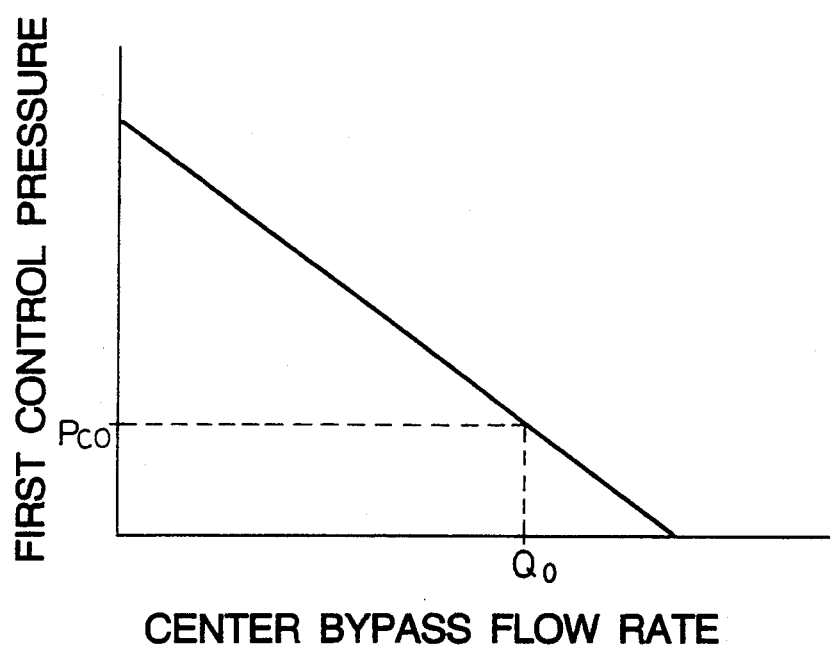
FIG. 15 is a graph showing a pressure generating characteristic of a pressure generator shown in FIG. 12.

The pressure generator 4B has a characteristic as shown in FIG. 15. More specifically, when the directional control valve 1 is held in its neutral state, the flow rate passing through the center bypass passage 1a shown in FIG. 12 takes a relatively large value Qo, and the spool 4a of the restricting device 50 is slid upwards in FIG. 12 against the urging force of the spring 4d to a large extent. Thus, the opening areas of the flow rate sensing notch 4c and the variable restrictor 4b are so large that the pressure generated by the variable restrictor 4b, i.e., the first control pressure introduced to the first pressure signal line 5B, is kept at a relatively small value Pco. When the directional control valve 1 is gradually stroked toward its shift position shown on the right side in FIG. 12 from the above condition with an intention of extending the arm cylinder 3, the flow rate passing through the center bypass passage 1a is reduced correspondingly. Therefore, the urging force of the spring 4d now prevails in the restricting device 50, whereupon the spool 4a is moved downwards in FIG. 12 to reduce the opening areas of the variable restrictor 4b and the flow rate sensing notch 4c. As a result, a passage leading from the hydraulic source 51 to the reservoir 24 is subjected to restriction and the pressure generated by the variable restrictor 4b, i.e., the first control pressure introduced to the first pressure signal line 5B, is gradually increased.

Figure 16:
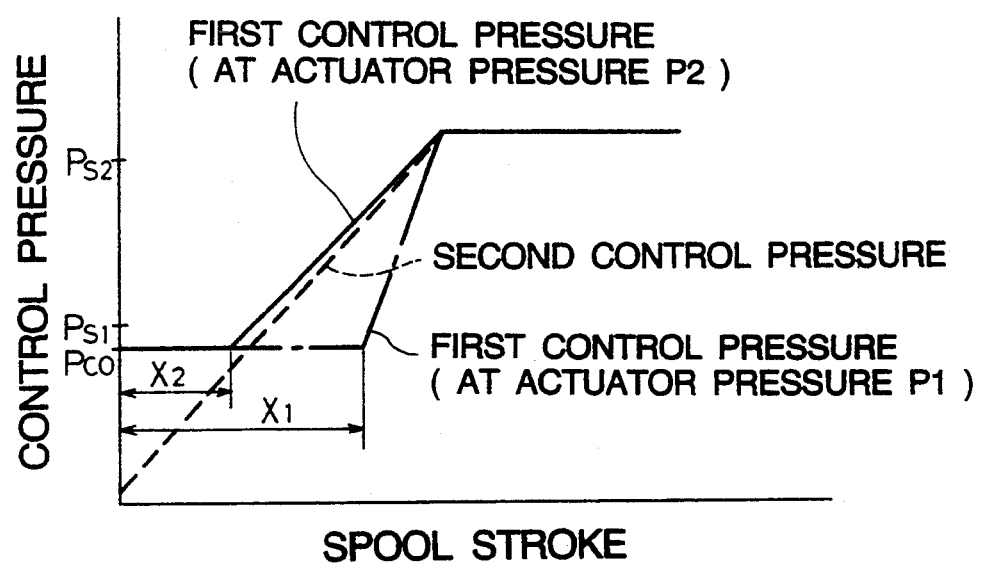
FIG. 16 is a graph showing the relationship of a spool stroke of a directional control valve versus first and second control pressures in the hydraulic drive system shown in FIG. 13.

Since the first control pressure is generated in the pressure generator 4B as mentioned above, the relationship between the spool stroke of the directional control valve 1 and the first control pressure is as shown in FIG. 16. More specifically, for the operation under a light load in which the load pressure of the arm cylinder 3 is relatively low as indicated by P2 in FIG. 3(b), the first control pressure is held at the aforesaid relatively small value Pco over a range X2 of the spool stroke before the arm cylinder 3 starts moving, i.e., at the spool stroke until the pump pressure rises to exceed the load pressure of the arm cylinder 3, and thereafter it slowly reduces in an almost proportional relation with an increase in the spool stroke, as represented by a solid line in FIG. 16. On the other hand, for the operation under a heavy load in which the load pressure of the arm cylinder 3 becomes high as indicated by P1 in FIG. 3(b), a range X1 of the spool stroke before the arm cylinder 3 starts moving is larger than the range X2 at P2; namely, the first control pressure is kept at the relatively small value Pco for a longer range, and thereafter it abruptly increases in an almost proportional relation with an increase in the spool stroke, as represented by a one-dot-chain line in FIG. 16.

As for the relationship between the spool stroke and the pilot pressure introduced as the second control pressure to the second pressure signal line 36B, it is as represented by a broken line in FIG. 16. Thus, the second control pressure increases almost proportionally to an increase in the spool stroke.

In comparison with the relationship between the first control pressure generated by the pressure generator 4B and the spool stroke, the relationship between the second control pressure introduced to the second pressure signal line 36B and the spool stroke is set such that the second control pressure is slightly smaller than the first control pressure represented by the solid line in FIG. 16 and resulted from the case of a light load at a relatively low predetermined lead pressure of the arm cylinder 3, e.g., the aforesaid pressure P2.

In the above construction, the first control pressure functions as a first control signal for determining a first target displacement of the hydraulic pump 2, and the pressure generator 4B and the first pressure signal line 5B cooperatively constitute first signal generating means which generates the first control signal for determining the first target displacement. Also, the second control pressure functions as a second control signal for determining a second target displacement of the hydraulic pump 2, and the second pressure signal line 36B constitutes second signal generating means which generates the second control signal for determining the second target displacement. Further, the shuttle valve 31B constitutes select means for selecting one of the first control signal and the second control signal which provides a larger target displacement, and applying the selected control signal to the pump regulator 6B.

In the third embodiment constructed as explained above, when the directional control valve 1 is gradually stroked toward its shift position shown on the right side in FIG. 12 with an intention of extending the arm cylinder 3, for example, in the case of a light load with the bucket kept empty, i.e., in a situation where the load pressure is relatively small as indicated by P2 in FIG. 3(b), the first control pressure introduced to the first pressure signal line 5B is provided as indicated by the solid line in FIG. 16 and the second control pressure introduced to the second pressure signal line 36B is provided as indicated by the broken line in FIG. 16, as mentioned before. Thus, the first control pressure is larger than the second control pressure, whereby the shuttle valve 31B selects the first control pressure which is applied to the pump regulator 6B through the third pressure signal line 37B. As a result, the pump regulator 6B is controlled by the first control pressure.

The relationship between the spool stroke of the directional control valve 1 and the pump delivery rate obtained at this time is similar to that indicated by the characteristic curve of "at pressure P2" in FIG. 3(d). Correspondingly, the relationship between the spool stroke of the directional control valve 1 and the flow rate supplied to the arm cylinder 3 is similar to that indicated by the characteristic curve of "at pressure P2" in FIG. 3(e). In other words, as with the first embodiment, the flow rate supplied to the arm cylinder 3 increases relatively slowly with respect to the spool stroke, thereby providing a satisfactory metering characteristic.

As an alternative example, when the directional control valve 1 is gradually stroked toward its shift position shown on the right side in FIG. 1 with an intention of extending the arm cylinder 3 in the case of a heavy load with the bucket hanging a burden, i.e., in a situation where the load pressure is considerably large as indicated by P1 in FIG. 3(b), the first control pressure introduced to the first pressure signal line 5B is provided as indicated by the one-dot-chain line in FIG. 16 and the second control pressure introduced to the second pressure signal line 36B is provided as indicated by the broken line in FIG. 16, as mentioned before. Thus, the second control pressure is larger than the first control pressure, whereby the shuttle valve 31B selects the second control pressure which is applied to the pump regulator 6B through the third pressure signal line 37B. As a result, the pump regulator 6B is controlled by the second control pressure.

The relationship between the spool stroke of the directional control valve 1 and the pump delivery rate obtained at this time is similar to that indicated by the characteristic curve of "at pressure P1" in FIG. 3(d). Correspondingly, the relationship between the spool stroke of the directional control valve 1 and the flow rate supplied to the arm cylinder 3 is similar to that indicated by the characteristic curve of "at pressure Pi" in FIG. 3(e). Consequently, in the case of a heavy load, the flow rate supplied to the arm cylinder 3 also increases relatively slowly in accordance with an increase in the spool stroke of the directional control valve 1, thereby providing a satisfactory metering characteristic, similarly to the case of a light load.

With the third embodiment, therefore, in addition to providing the metering characteristic as good as conventional in the case of a light load, the satisfactory metering characteristic almost comparable to that in the case of a light load can also be obtained in the case of a heavy load. It is thus possible to improve the working efficiency arid make the operator feel less fatigued.

Fourth Embodiment

A fourth embodiment of the present invention will be described with reference to FIGS. 17 to 20. In these figures, identical members to those in FIG. 1 and others are denoted by the same reference numerals. In this embodiment, the second signal generating means is constituted so as to generate a control signal having a constant level.

Figure 17:
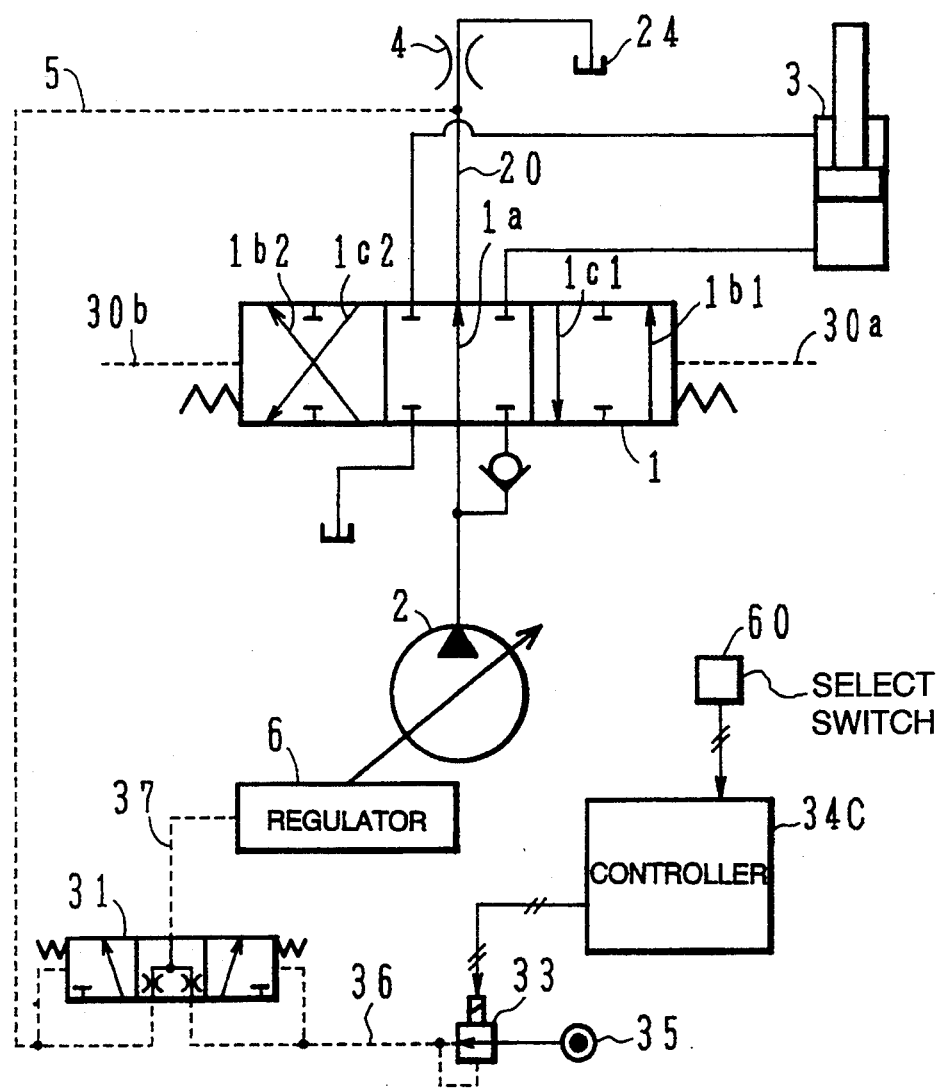
FIG. 17 is a circuit diagram showing a hydraulic drive system for hydraulic working machines according to a fourth embodiment of the present invention.

In FIG. 17, a hydraulic drive system of this fourth embodiment comprises the fixed restrictor 4, the first pressure signal line 5, the solenoid proportional reducing valve 33, the hydraulic source 35, the second pressure signal line 36, the lower-pressure select valve 31, and the negative type pump regulator 6, similarly to the first embodiment, and further comprises a select switch 60 manipulated by the operator for producing an ON/-OFF signal, and a controller 34C operated by the ON/-OFF signal from the select switch 60 for outputting an electric drive signal, corresponding to the second control pressure, to the solenoid proportional reducing valve 33.

Figure 18:
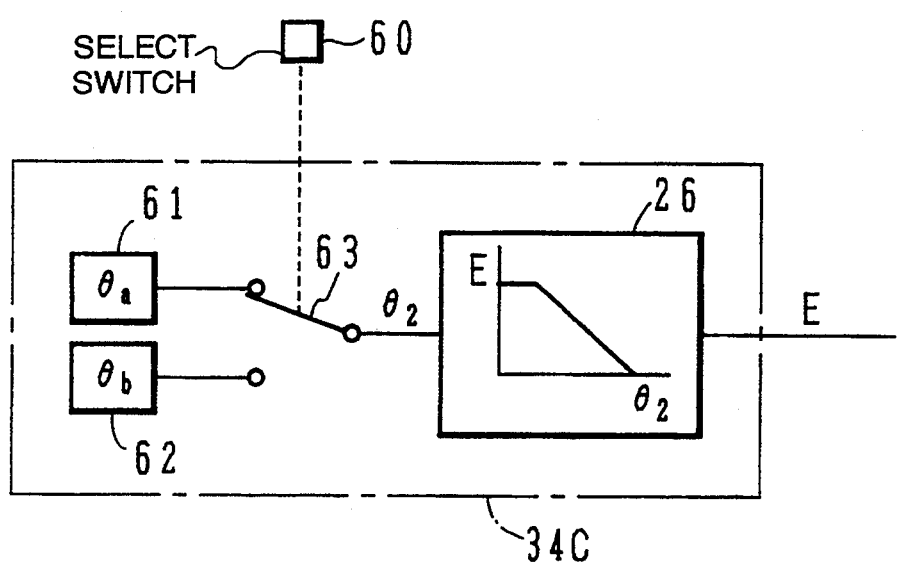
FIG. 18 is a block diagram showing a control function of a controller shown in FIG. 17.

The controller 34C includes, as shown in FIG. 18, a first setting unit 61 for storing a first target displacement ha, a second setting unit 62 for storing a second target displacement hb larger than the first target displacement ha, a selector 63 for selecting the first target displacement ha as a target displacement h2 when the select switch 60 is not manipulated and the signal produced therefrom is OFF, and the second target displacement hb as the target displacement h2 when the select switch 60 is manipulated to produce the ON signal, and a functional generator 26 for setting the relationship following which an electric drive signal E reduces with an increase in the target displacement h2 selected by the selector 63. As a result, the controller 34C outputs the electric drive signal E, which corresponds to the first target displacement ha, to the solenoid proportional reducing valve 33 when the signal output from the select switch 60 is OFF, and also outposts the electric drive signal E, which corresponds to the second target displacement hb, to the solenoid proportional reducing valve 33 when the ON signal is output from the select switch 60, whereupon the solenoid proportional reducing valve 33 produces, as the second control pressure, a pressure at a constant level corresponding to either target displacement.

Figure 19:
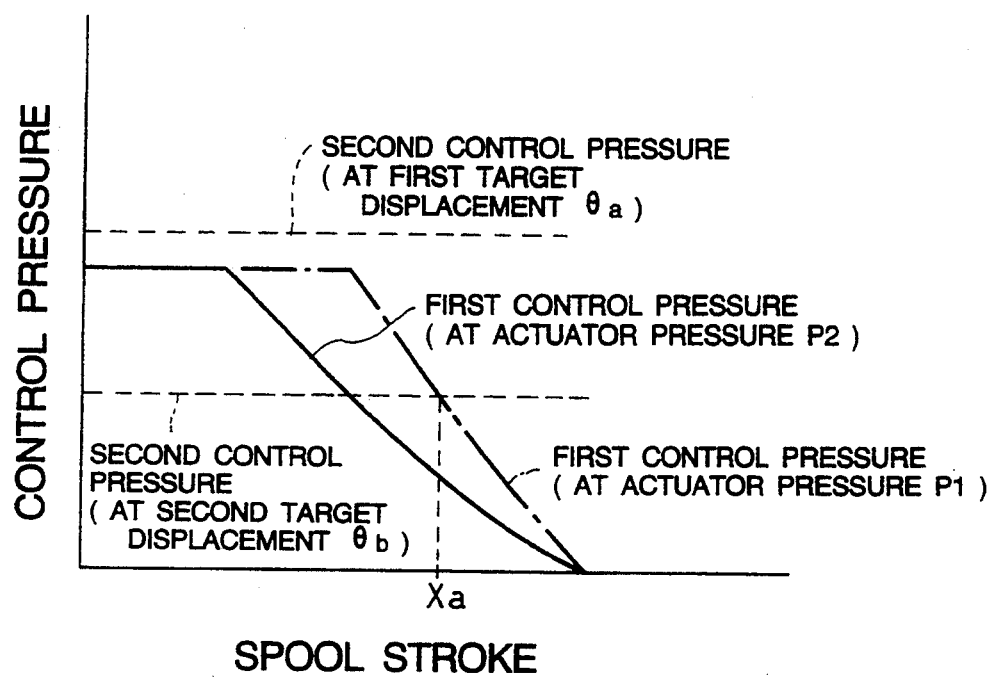
FIG. 19 is a graph showing the relationship of a spool stroke of a directional control valve versus first and second control pressures in the hydraulic drive system shown in FIG. 17.

The second control pressure produced in this way is set to be, as indicated by broken lines in FIG. 19, larger than a maximum value of the first control pressure when the first target displacement ha is selected, and smaller than the maximum value of the first control pressure when the second target displacement hb is selected.

In the above construction, the first control pressure functions as a first control signal for determining the first target displacement of the hydraulic pump 2, and the fixed restrictor 4 and the first pressure signal line 5 cooperatively constitute first signal generating means which generates the first control signal. Also, the second control pressure functions as a second control signal for determining the second target displacement (h2 in FIG. 18 ) of the hydraulic pump 2, and the select switch 60, the controller 34C, the hydraulic source 35, the solenoid proportional reducing valve 33 and the second pressure signal line 36 cooperatively constitute second signal generating means which generates the second control signal. Further, the lower-pressure select valve 6 constitutes select means for selecting one of the first control signal and the second control signal which provides a larger target displacement, and applying the selected control signal to the pump regulator 6.

In the fourth embodiment constructed as explained above, when the select switch 60 is not manipulated to hold the signal OFF, for example, in the case of a light load with the bucket kept empty, i.e., in a situation where the load pressure is relatively small as indicated by P2 in FIG. 3(b), the first target displacement ha is selected in the controller 34C and the second control pressure introduced to the second pressure signal line 36 is larger than the maximum value of the first control pressure, as mentioned above. Therefore, the lower-pressure select valve S1 selects the first control pressure which is applied to the pump regulator 6 through the third pressure signal line 37. As a result, the pump regulator 6 is controlled by the first control pressure.

Figure 20A:
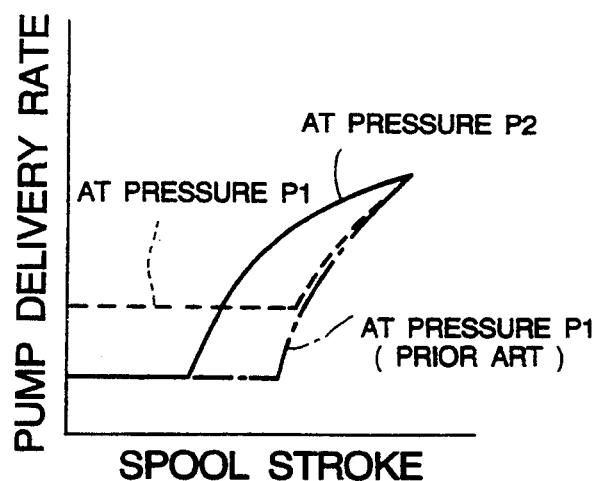
FIG. 20(a) is a graph showing the relationship between a spool stroke of a directional control valve and a delivery rate of the hydraulic pump.
Figure 20B:
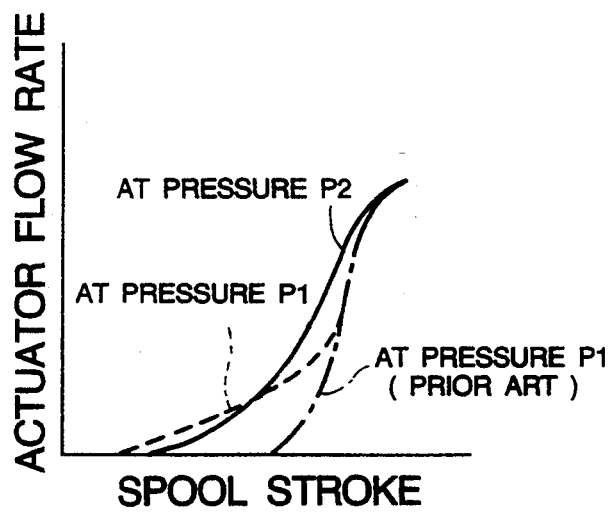
FIG. 20(b) is a graph showing the relationship between the spool stroke of the directional control valve and a flow rate supplied to an actuator.

The relationship between the spool stroke of the directional control valve 1 and the pump delivery rate obtained at this time is as indicated by a characteristic curve of "at pressure P2" in FIG. 20(a). Correspondingly, the relationship between the spool stroke of the directional control valve 1 and the flow rate supplied to the arm cylinder 3 is as indicated by a characteristic curve of "at pressure P2" in FIG. 20(b). In other words, as with the first embodiment, the flow rate supplied to the arm cylinder 3 increases relatively slowly with respect to the spool stroke, thereby providing a satisfactory metering characteristic.

As an alternative example, when the select switch 60 is manipulated to produce the ON signal in the case of a heavy load with the bucket hanging a burden, i.e., in a situation where the load pressure is considerably large as indicated by P1 in FIG. 3(b), the second target displacement hb is selected in the controller 34C and the second control pressure introduced to the second pressure signal line 36 is smaller than the maximum value of the first control pressure, as mentioned above. Therefore, the lower-pressure select valve 31 selects the second control pressure until the spool stroke reaches Xa indicated in FIG. 19, the second control pressure being applied to the pump regulator 6 through the third pressure signal line 37 so that the pump regulator 6 is controlled by the second control pressure. After the spool stroke has exceeded Xa, the lower-pressure select valve 31 selects the first control which is applied to the pump regulator 6 through the third pressure signal line 37 so that the pump regulator 6 is controlled by the second control pressure.

the relationship between the spool stroke of the directional control valve 1 and the pump delivery rate obtained at this time is as indicated by a characteristic curve of "at pressure P1" in FIG. 20(a). Correspondingly, the relationship between the spool stroke of the directional control valve 1 and the flow rate supplied to the arm cylinder 3 is as indicated by a characteristic curve of "at pressure P1" in FIG. 20(b). Consequently, in the case of a heavy load, the flow rate supplied to the arm cylinder 3 also increases relatively slowly in accordance with an increase in the spool stroke of the directional control valve 1, thereby providing a satisfactory metering characteristic, similarly to the case of a light load.

With the fourth embodiment, therefore, in addition to providing the metering characteristic as good as conventional in the case of a light load, the satisfactory metering characteristic almost comparable to that in the case of a light load can also be obtained in the case of a heavy load. It is thus possible to improve the working efficiency and make the operator feel less fatigued.

Figure 21:
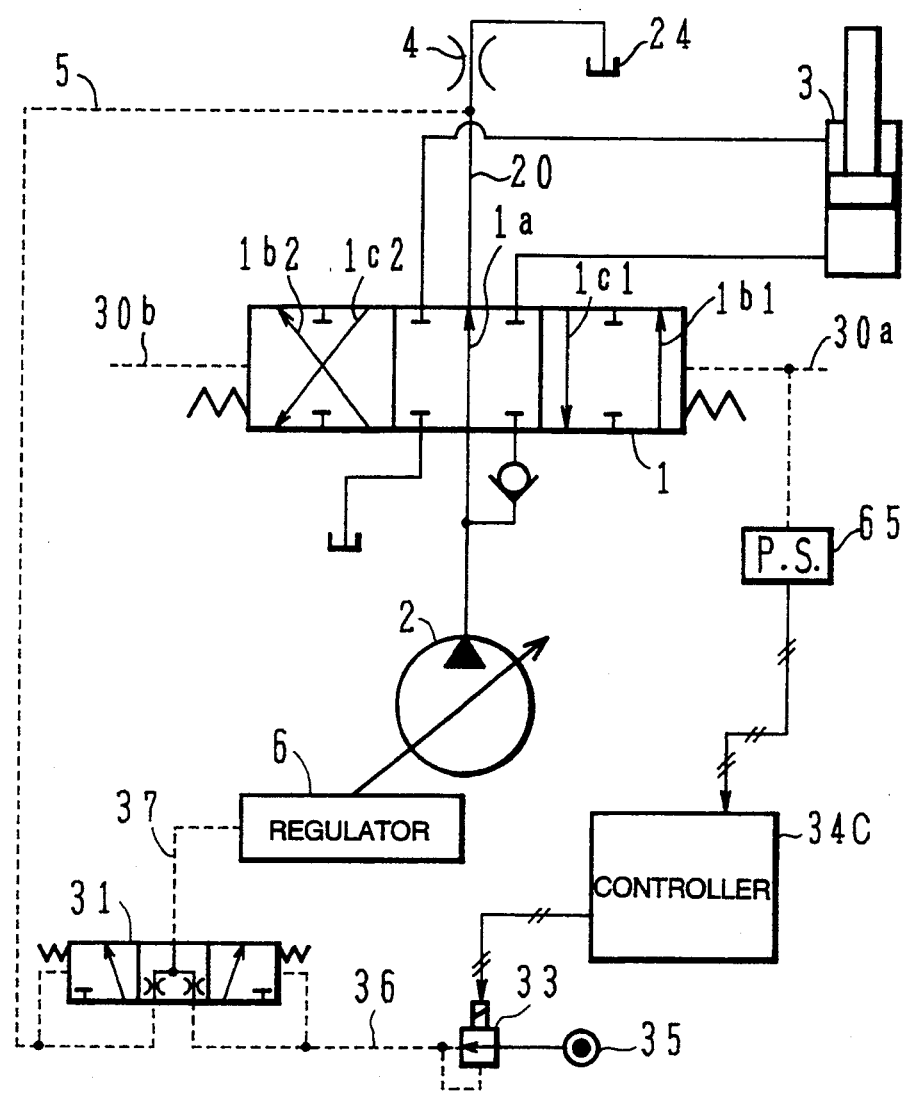
FIG. 21 is a circuit diagram showing a hydraulic drive system for hydraulic working machines according to a modification of the fourth embodiment shown in FIG. 17.

A modification of the fourth embodiment is shown in FIG. 21. This modification includes a pressure switch 65 operable in response to the pilot pressure Pa for driving the directional control valve 1 in place of the select switch 60 manipulated by the operator. The pressure switch 65 makes a signal generated from itself OFF when the pilot pressure Pa is not produced and the directional control valve 1 is held in its neutral position, and outputs an ON signal when the pilot pressure Pa is produced and the directional control valve 1 is shifted. In this modification, therefore, the similar operation to that under a heavy load in the fourth embodiment is effected in both the cases of light and heavy loads, thereby providing a satisfactory metering characteristic under a heavy load as well.

Fifth Embodiment

A fifth embodiment of the present invention will be described with reference to FIGS. 22 to 24. In these figures, identical members to those in FIG. 1 and others are denoted by the same reference numerals. In this embodiment, the present invention is applied to a hydraulic circuit including a plurality of directional control valves of center bypass type.

Figure 22:
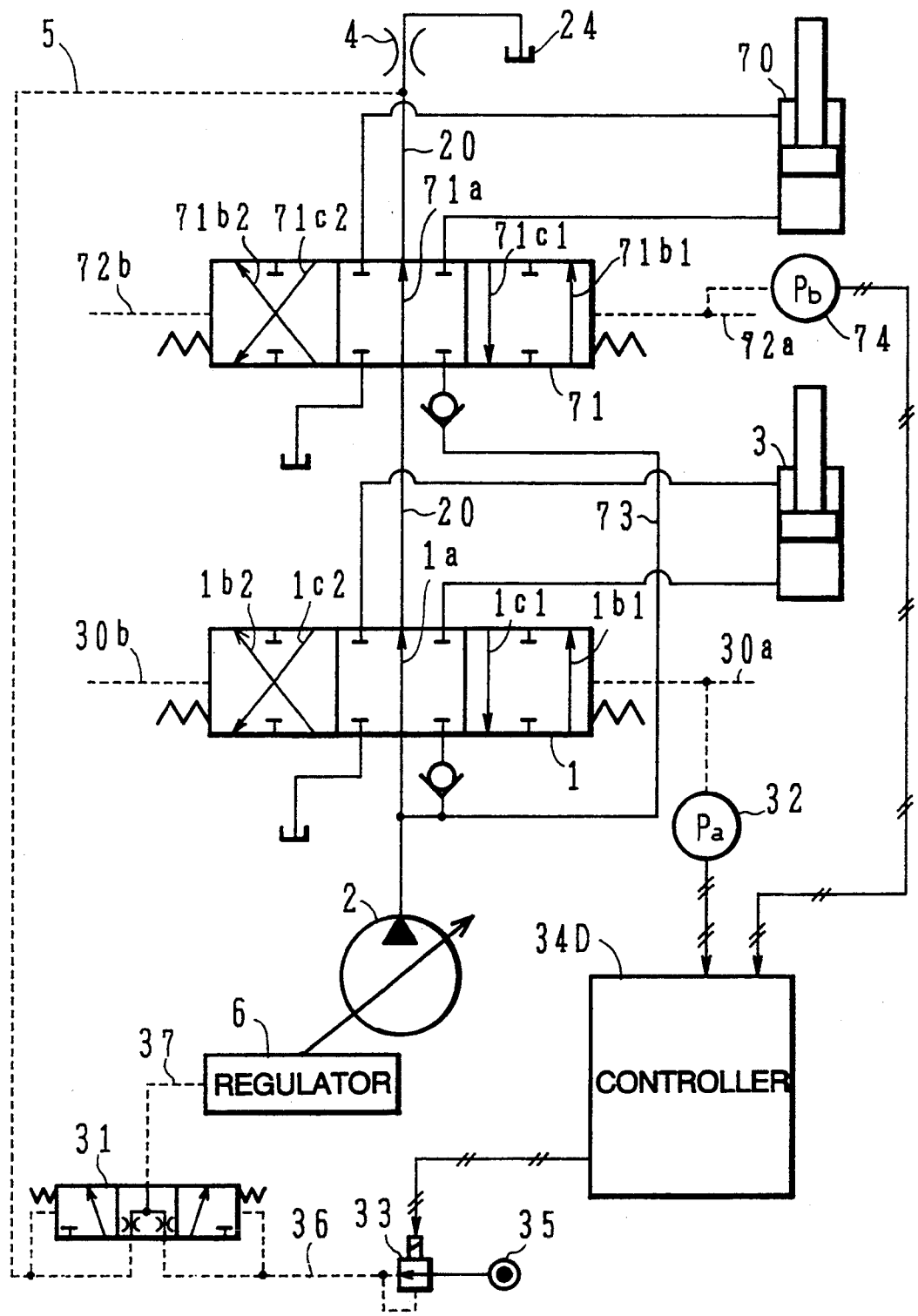
FIG. 22 is a circuit diagram showing a hydraulic drive system for hydraulic working machines according to a fifth embodiment of the present invention.

In FIG. 22, a hydraulic drive system of this fifth embodiment comprises, in addition to the arrangement of the first embodiment, another actuator, e.g., a boom cylinder 70, driven by the hydraulic fluid delivered from the hydraulic pump 2, and another directional control valve 71 of center bypass type positioned downstream of the directional control valve 1 for the arm cylinder 3 for controlling a flow of the hydraulic fluid supplied from the hydraulic pump 2 to the boom cylinder 70.

The directional control valve 70 is also a pilot-operated valve driven by a pilot pressure introduced through a pilot line 72a, 72b, and includes a center bypass passage 71a, meter-in passages 71b1, 71b2 and meter-out passages 71c1, 71c2. As with the directional control valve 1, the center bypass passage 71a, the meter-in passages 71b1, 71b2 and the meter-out passages 71c1, 71c2 are respectively provided with bleed-off variable restrictors 21a, 21b, meter-in variable restrictors 22a, 22b and meter-out variable restrictors 23a, 23b as shown in FIG. 2. The center bypass line 20 connects the center bypass passages 1a, 71a of the directional control valves 1, 71 to the reservoir 24 in series. The fixed restrictor 4 as a pressure generator is positioned downstream of the center bypass passage 71a of the directional control valve 71. A hydraulic fluid supply port common to the meter-in passages 71b1, 71b2 of the directional control valve 71 is connected via a hydraulic fluid supply line 73b in parallel to a hydraulic fluid supply port common to the meter-in passages 1b1, 1b2 of the directional control valve 1.

Further, connected to the pilot line 72a is a pressure sensor 74 for detecting a magnitude of the pilot pressure introduced through the pilot line 72a and outputting an electric detect, on signal corresponding to the detected magnitude, the detection signal being output to a controller 34D.

Figure 23:
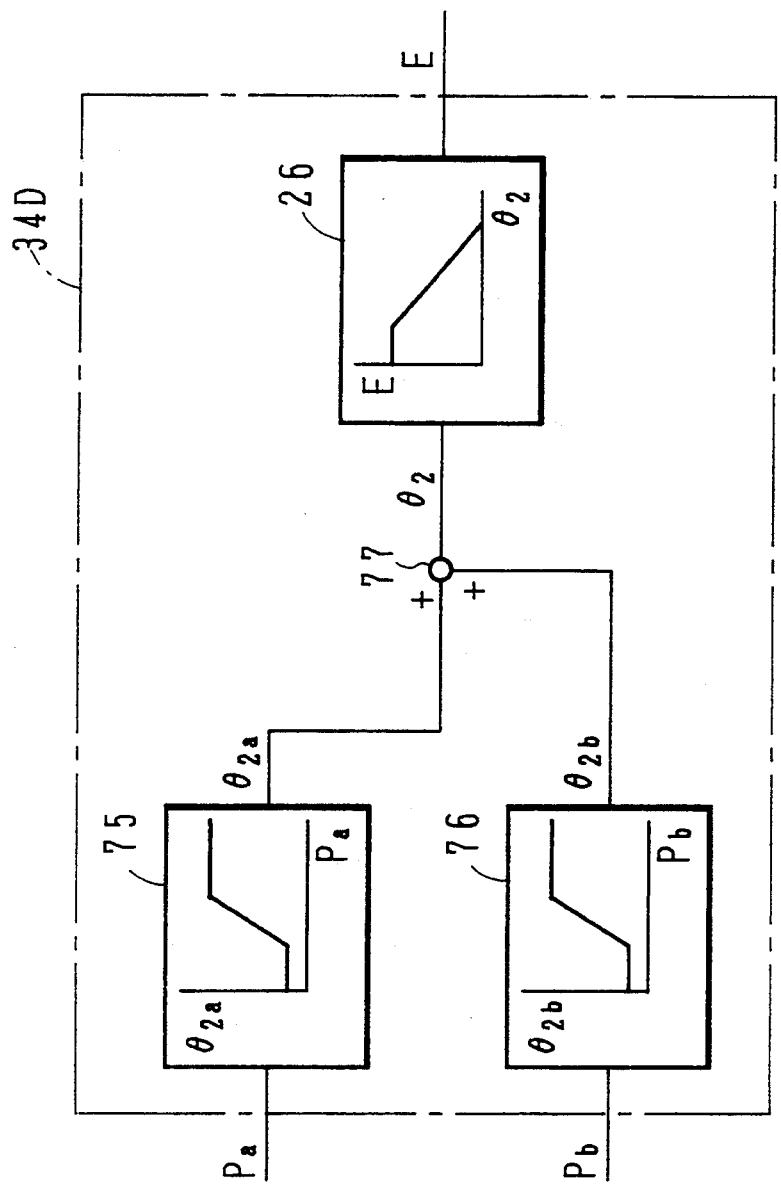
FIG. 23 is a block diagram showing a control function of a controller shown in FIG. 22.

The controller 34D includes, as shown in FIG. 23, a function generator 75 for storing the relationship following which a first target displacement h2a increases with a rise of the pilot pressure Pa as a value of the detection signal output from the pressure sensor 32, and calculating the first target displacement h2 depending on the pilot pressure Pa, a function generator 76 for storing the relationship following which a second target displacement h2b increases with a rise of the pilot pressure Pb as a value of the detection signal output from the pressure sensor 75, and calculating the second target displacement h2b depending on the pilot pressure Pb, an adder 77 for adding the first and second target displacements h2a, h2b output from the function generators 75, 76 and determining a new target displacement h2, and a function generator 26 for setting the relationship following which an electric drive signal E reduces with an increase in the target displacement h2. As a result, the controller 34D outputs the electric drive signal E, which reduces with an increase in the sum of the two pilot pressure Pa and Pb, to the solenoid proportional reducing valve 33. The solenoid proportional reducing valve 33 is driven by the drive signal E to produce a pressure, as the second control pressure, of which magnitude is almost proportional to the drive signal E.

The relationship between the second control pressure thus produced and the spool stroke of the directional control valve 1 is set such that the second control pressure is greater than the first control pressure resulted from the case of a light load at a predetermined load pressure when the arm cylinder 3 or the boom cylinder 70 is operated solely, and the second control pressure is also slightly greater than the first control pressure resulted from the case of a light load at a predetermined load pressure when the arm cylinder 3 and the boom cylinder 70 are both operated simultaneously.

In the above construction, similarly to the first embodiment, the first control pressure functions as a first control signal for determining the first target displacement of the hydraulic pump 2, and the fixed restrictor 4 and the first pressure signal line 5 cooperatively constitute first signal generating means which generates the first control signal. Also, the second control pressure functions as a second control signal for determining the second target displacement (h2 in FIG. 23) of the hydraulic pump 2, and the pressure sensors 32, 74, the controller 34D, the hydraulic source 35, the solenoid proportional reducing valve 33 and the second pressure signal line 36 cooperatively constitute second signal generating means which generates the second control signal. Further, the lower-pressure select valve 6 constitutes select means for selecting one of the first control signal and the second control signal which provides a larger target displacement, and applying the selected control signal to the pump regulator 6.

In this embodiment constructed as explained above, the similar advantage to that in the first embodiment can be obtained during the sole operation of the arm cylinder 3, and the satisfactory metering characteristic can also be obtained in the both case of light and heavy loads during the combined operation in which the arm cylinder 3 and the boom cylinder 70 are driven simultaneously. It is thus possible to improve the working efficiency and make the operator feel less fatigued in the case of a heavy load.

Figure 24:
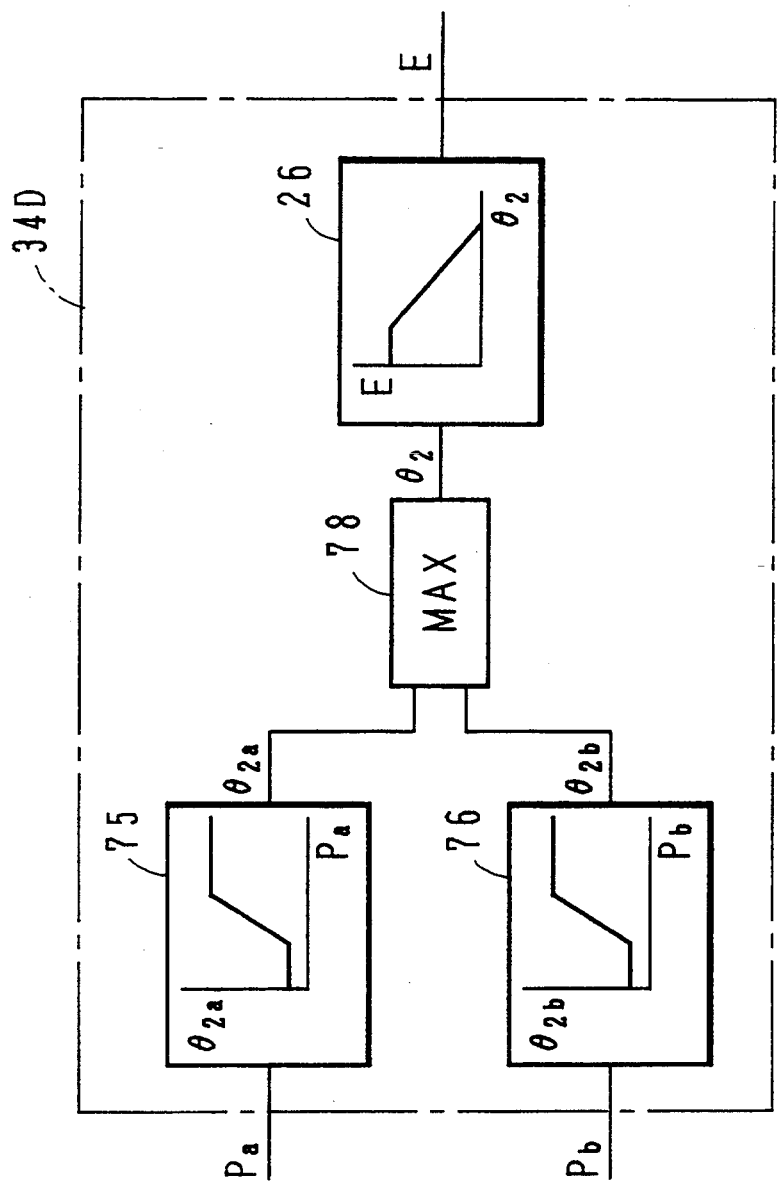
FIG. 24 is a block diagram showing another example of a control function of the controller shown in FIG. 22.

While the first and second target displacements h2a, h2b output from the function generators 75, 76 are added by the adder 77 to determine the new target displacement h2 in the above fifth embodiment, a maximum value selector 78 may be provided in place of the adder, as shown in FIG. 24, to determine larger one of the first and second target displacements h2a, h2b as the new target displacement h2. With this modification, the similar advantage can also be obtained.

Furthermore, while the first, second, fourth and fifth embodiments employ the fixed restrictor 4 as the pressure generator disposed in the center bypass line 20, any other suitable flow resisting means such as a relief valve may be provided instead.

INDUSTRIAL APPLICABILITY

According to the present invention, a satisfactory metering characteristic can be obtained in not only the case of a light load, but also in the case of a heavy load. As a consequence, there can be provided advantages of improving the working efficiency and making the operator feel less fatigued in the case of a heavy load as compared with the prior art.

We claim:

1. A hydraulic drive system for hydraulic working machines comprising a variable displacement hydraulic pump, at least one actuator driven by a hydraulic fluid delivered from said hydraulic pump, a directional control valve of center bypass type having meter-in passages provided with meter-in variable restrictors and a center bypass passage provided with bleed-off variable restrictors and controlling a flow of the hydraulic fluid supplied from said hydraulic pump to said actuator, a low pressure circuit, a center bypass line for connecting said center bypass passage to said low pressure circuit at a location downstream of said bleed-off variable restrictors, pressure generating means disposed in said center bypass line, first signal generating means for generating a first control signal which determines a first target displacement of said hydraulic pump, by using a pressure generated by said pressure generating means, and a pump regulator for controlling a displacement of said hydraulic pump in accordance with said first control signal, wherein said hydraulic drive system further comprises:

second signal generating means for generating a second control signal which determines a second target displacement of said hydraulic pump, and select means for selecting, as a third control signal, a larger one of said first control signal and said second control signal which provides a larger target displacement, and applying said third control signal to said pump regulator, wherein said second signal generating means is means for generating, as said second control signal, a control signal variable depending on a stroke amount of said directional control value.

2. A hydraulic drive system for hydraulic working machines according to claim 1, wherein said first signal generating means includes a first pressure signal line for introducing the pressure generated by said pressure generating means, as said first control signal, to said select means, and said second signal generating means includes electric signal generating means for generating an electric signal of a magnitude corresponding to said second target displacement, signal converting means for converting said electric signal into a pressure signal, and a second pressure signal line for introducing said pressure signal, as said second control signal, to said select means.

3. A hydraulic drive system for hydraulic working machines comprising a variable displacement hydraulic pump, at least one actuator driven by a hydraulic fluid delivered from said hydraulic pump, a directional control valve of center bypass type having meter-in passages provided with meter-in variable restrictors and a center bypass passage provided with bleed-off variable restrictors and controlling a flow of the hydraulic fluid supplied from said hydraulic pump to said actuator, a low pressure circuit, a center bypass line for connecting said center bypass passage to said low pressure circuit at a location downstream of said bleed-off variable restrictors, pressure generating means disposed in said center bypass line, first signal generating means for generating a first control signal which determines a first target displacement of said hydraulic pump, by using a pressure generated by said pressure generating means, and a pump regulator for controlling a displacement of said hydraulic pump in accordance with said first control signal, wherein said hydraulic drive system further comprises:

second signal generating means for generating a second control signal which determines a second target displacement of said hydraulic pump, and select means for selecting, as a third control signal, larger one of said first control signal and said second control signal which provides a larger target displacement, and applying said third control signal to said pump regulator, wherein said first signal generating means includes a first pressure signal line for introducing the pressure generated by said pressure generating means, as said first control signal, to said select means, and said second signal generating means includes electric signal generating means for generating an electric signal of magnitude corresponding to said second target displacement, signal converting means for converting said electric signal into a pressure signal, and a second pressure signal line for introducing said pressure signal, as said second control signal, to said select means, and wherein said electric signal generating means includes for detecting the stroke amount of said directional control valve and outputting an electric detection signal, and means for producing said electric signal in accordance with said detection signal.

4. A hydraulic drive system for hydraulic working machines comprising a variable displacement hydraulic pump, at least one actuator driven by a hydraulic fluid delivered from said hydraulic pump, a directional control valve of center bypass type having meter-in passages provided with meter-in variable restrictors and a center bypass passage provided with bleed-off variable restrictors and controlling a flow of the hydraulic fluid supplied from said hydraulic pump to said actuator, a low pressure circuit, a center bypass line for connecting said center bypass passage to said low pressure circuit at a location downstream of said bleed-off variable restrictors, pressure generating means disposed in said center bypass line, first signal generating means for generating a first control signal which determines a first target displacement of said hydraulic pump, by using a pressure generated by said pressure generating means, and a pump regulator for controlling a displacement of said hydraulic pump in accordance with said first control signal., wherein said hydraulic drive system further comprises:

second signal generating means for generating a second control signal which determines a second target displacement of said hydraulic pump, and select means for selecting, as a third control signal, larger one of said first control signal and said second control signal which provides a larger target displacement, and applying said third control signal to said pump regulator, wherein said first signal generating means includes means for detecting the pressure generated by said pressure generating means and outputting an electric detection signal, and means for calculating, as said first control signal, a first target value corresponding to said first target displacement in accordance with said detection signal, said second signal generating means includes means for calculating, as said second control signal, a second target value corresponding to said second target displacement, and said select means includes means for selecting larger one of said first and second target values, and means for producing an electric drive signal corresponding to said selected target value and outputting said electric drive signal to said regulator.

5. A hydraulic drive system for hydraulic working machines according to claim 4, wherein said second signal generating means further includes means for detecting the stroke amount of said directional control valve and outputting an electric detection signal, and said means for calculating said second target value is means for calculating said second target value in accordance with said detection signal.

6. A hydraulic drive system for hydraulic working machines according to claim 1, wherein said first signal generating means includes a first pressure signal line for introducing the pressure generated by said pressure generating means, as said first control signal, to said select means, and said second signal generating means includes a second pressure signal line for introducing a pressure signal of magnitude corresponding to said second target displacement, as said second control signal, to said select means.

7. A hydraulic drive system for hydraulic working machines comprising a variable displacement hydraulic pump, at least one actuator driven by a hydraulic fluid delivered from said hydraulic pump, a directional control valve of center bypass type having meter-in passages provided with meter-in variable restrictors and a center bypass passage provided with bleed-off variable restrictors and controlling a flow of the hydraulic fluid supplied from said hydraulic pump to said actuator, a low pressure circuit, a center bypass line for connecting said center bypass passage to said low pressure circuit at a location downstream of said bleed-off variable restrictors, pressure generating means disposed in said center bypass line, first signal generating means for generating a first control signal which determines a first target displacement of said hydraulic pump, by using a pressure generated by said pressure generating means, and a pump regulator for controlling a displacement of said hydraulic pump in accordance with said first control signal, wherein said hydraulic drive system further comprises:
 second signal generating means for generating a second control signal which determines a second target displacement of said hydraulic pump, and
 select means for selecting, as a third control signal, larger one of said first control signal and said second control signal which provides a larger target displacement, and applying said third control signal to said pump regulator,
 wherein said first signal generating means includes a first pressure signal line for introducing the pressure generated by said pressure generating means, as said first control signal, to said select means, and said second signal generating means includes a second pressure signal line for introducing a pressure signal of magnitude corresponding to said second target displacement, as said second control signal, to said select means, and
 wherein said directional control valve is a pilot-operated valve driven by a pilot pressure, and said second pressure signal line introduces said pilot pressure as said pressure signal.

8. A hydraulic drive system for hydraulic working machines comprising a variable displacement hydraulic pump, at least one actuator driven by a hydraulic fluid delivered from said hydraulic pump, a directional control valve of center bypass type having meter-in passages provided with meter-in variable restrictors and a center bypass passage provided with bleed-off variable restrictors and controlling a flow of the hydraulic fluid supplied from said hydraulic pump to said actuator, a low pressure circuit, a center bypass line for connecting said center bypass passage to said low pressure circuit at a location downstream of said bleed-off variable restrictors, pressure generating means disposed in said center bypass line, first signal generating means for generating a first control signal which determines a first target displacement of said hydraulic pump, by using a pressure generated by said pressure generating means, and a pump regulator for controlling a displacement of said hydraulic pump in accordance with said first control signal, wherein said hydraulic drive system further comprises:
 second signal generating means for generating a second control signal which determines a second target displacement of said hydraulic pump, and
 select means for selecting, as a third control signal, larger one of said first control signal and said second control signal which provides a larger target displacement, and applying said third control signal to said pump regulator,
 wherein said second signal generating means includes means for storing, as said second target displacement, at least two target displacements of which magnitudes are constant and different from each other, means operated in response to an ON/OFF signal for selecting one of said two target displacements, and means for producing said second control signal in accordance with said selected target displacement.

9. A hydraulic drive system for hydraulic working machines according to claim 8, wherein said second signal generating means further includes means manipulated by an operator for outputting said ON/OFF signal.

10. A hydraulic drive system for hydraulic working machines according to claim 8, wherein said second signal generating means further includes means for producing said ON/OFF signal in accordance with an operation of said directional control valve.

11. A hydraulic drive system for hydraulic working machines comprising a variable displacement hydraulic pump, at least one actuator driven by a hydraulic fluid delivered from said hydraulic pump, a directional control valve of center bypass type having meter-in passages provided with meter-in variable restrictors and a center bypass passage provided with bleed-off variable restrictors and controlling a flow of the hydraulic fluid supplied from said hydraulic pump to said actuator, a low pressure circuit, a center bypass line for connecting said center bypass passage to said low pressure circuit at a location downstream of said bleed-off variable restrictors, pressure generating means disposed in said center bypass line, first signal generating means for generating a first control signal which determines a first target displacement of said hydraulic pump, by using a pressure generated by said pressure generating means, and a pump regulator for controlling a displacement of said hydraulic pump in accordance with said first control signal, wherein said hydraulic drive system further comprises:
 second signal generating means for generating a second control signal which determines a second target displacement of said hydraulic pump, and select means for selecting, as a third control signal, larger one of said first control signal and said second control signal which provides a larger target displacement, and applying said third control signal to said pump regulator, wherein said pump regulator is a negative type regulator operating to increase a displacement of said hydraulic pump as a value of said third control signal reduces, and said first and second signal generating means are means for generating, as said first and second control signals, respective control signals of which values are smaller at the greaters stroke amount of said directional control valve.

12. A hydraulic drive system for hydraulic working machines comprising a variable displacement hydraulic pump, at least one actuator driven by a hydraulic fluid delivered from said hydraulic pump, a directional control valve of center bypass type having meter-in passages provided with meter-in variable restrictors and a center bypass passage provided with bleed-off variable restrictors and controlling a flow of the hydraulic fluid supplied from said hydraulic pump to said actuator, a low pressure circuit, a center bypass line for connecting said center bypass passage to said low pressure circuit at a location downstream of said bleed-off variable restrictors, pressure generating means disposed in said center bypass line, first signal generating means for generating a first control signal which determines a first target displacement of said hydraulic pump, by using a pressure generated by said pressure generating means, and a pump regulator for controlling a displacement of said hydraulic pump in accordance with said first control signal wherein said hydraulic drive system further comprises:

second signal generating means for generating a second control signal which determines a second target displacement of said hydraulic pump, and select means for selecting, as a third control signal, larger one of said first control signal and said second control signal which provides a larger target displacement, and applying said third control signal to said pump regulator, wherein said pump regulator is a positive type regulator operating to increase a displacement of said hydraulic pump as a value of said third control signal increases, and said first and second signal generating means are means for generating, as said first and second control signals, respective control signals of which values are larger at the greater stroke amount of said directional control valve.

13. A hydraulic drive system for hydraulic working machines comprising a variable displacement hydraulic pump, at least first and second driven by the hydraulic fluid delivered from said hydraulic pump, a first directional control valve of center bypass type having meter-in passages provided with meter-in variable restrictors and a center bypass passage provided with bleed-off variable restrictors, and controlling a flow of the hydraulic fluid supplied from said hydraulic pump to said first actuator, and a second directional control valve of center bypass type having meter-in passages provided with meter-in variable restrictors and a center bypass passage provided with bleed-off variable restrictors, and controlling a flow of the hydraulic fluid supplied from said hydraulic pump to said second actuator, said center bypass line connecting said center bypass passages of said first and second directional control valves in series to said low pressure circuit at a location downstream of said bleed-off variable restrictors, pressure generating means disposed in said center bypass line, first signal generating means for generating a first control signal which determines a first target displacement of said hydraulic pump, by using a pressure generated by said pressure generating means, and a pump regulator for controlling a displacement of said hydraulic pump in accordance with said first control signal, wherein said hydraulic drive system further comprises:

second signal generating means for generating a second control signal which determines a second target displacement of said hydraulic pump, select means for selecting, as a third control signal, larger one of said first control signal and said second control signal which provides a larger target displacement, and applying said third control signal to said pump regulator, wherein said second signal generating means includes first detecting means for detecting a stroke amount of said first directional control valve, second detecting means for detecting a stroke amount of said second directional control valve, and signal producing means for producing said second control signal in accordance with output signals from said first and second detecting means.

14. A hydraulic drive system for hydraulic working machines according to claim 11, further including means for determining said third target displacement in accordance with the output signal from said first detecting means, means for determining a fourth target displacement in accordance with the output signal from said second detecting means, and means for adding said third and fourth target displacements to provide said second target displacement.

15. A hydraulic drive system for hydraulic working machines according to claim 11, further including means for determining said third target displacement in accordance with the output signal from said first detecting means, means for determining a fourth target displacement in accordance with the output signal from said second detecting means, and means for selecting a larger one of said third and fourth target displacements to provide said second target displacement.

* * * * *